US012502888B2

(12) United States Patent
Okano et al.

(10) Patent No.: US 12,502,888 B2
(45) Date of Patent: Dec. 23, 2025

(54) JOINED SUBSTRATE, DROPLET EJECTION HEAD, AND METHOD OF MANUFACTURING JOINED SUBSTRATE

(71) Applicant: CANON KABUSHIKI KAISHA, Tokyo (JP)

(72) Inventors: Kazuhisa Okano, Tokyo (JP); Manabu Otsuka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 18/392,088

(22) Filed: Dec. 21, 2023

(65) Prior Publication Data

US 2024/0208219 A1 Jun. 27, 2024

(30) Foreign Application Priority Data

Dec. 23, 2022 (JP) ................................ 2022-207560

(51) Int. Cl.
*B41J 2/14* (2006.01)

(52) U.S. Cl.
CPC ........ *B41J 2/14233* (2013.01); *B41J 2202/11* (2013.01); *B41J 2202/12* (2013.01)

(58) Field of Classification Search
CPC ............... B41J 2/14233; B41J 2202/11; B41J 2202/12; B41J 2002/14241; B41J 2/1629; B41J 2/1631; B41J 2002/14419; B41J 2002/14491; B41J 2/161; B41J 2/1632; B41J 2/1623
See application file for complete search history.

(56) References Cited

U.S. PATENT DOCUMENTS

2019/0217617 A1* 7/2019 Otsuka .................. B41J 2/1629

FOREIGN PATENT DOCUMENTS

JP 2005-53117 A 3/2005

* cited by examiner

*Primary Examiner* — Lisa Solomon
(74) *Attorney, Agent, or Firm* — VENABLE LLP

(57) ABSTRACT

Provided is a joined substrate in which a first substrate, a second substrate, and a third substrate are joined in this order with an adhesive agent therebetween, the joined substrate comprising: one or more grooves formed in a groove region of a surface of the first substrate not facing the second substrate; and a bulging portion formed in a back region of a surface of the second substrate not facing the first substrate, the bulging portion bulging in a thickness direction, the back region corresponding to the groove region in a plane direction.

20 Claims, 18 Drawing Sheets

JOINED SUBSTRATE, DROPLET EJECTION HEAD, AND METHOD OF MANUFACTURING JOINED SUBSTRATE

BACKGROUND OF THE DISCLOSURE

Field of the Disclosure

The present disclosure relates to a joined substrate, a droplet ejection head, and a method of manufacturing a joined substrate.

Description of the Related Art

In recent years, inkjet printers have become popular for a variety of applications. Droplet ejection apparatuses like inkjet printers include a droplet ejection head for ejecting droplets. Many of droplet ejection heads include nozzles that eject inks in the form of droplets, ink chambers (cavities) to accommodate the inks, channels, and driving units such as heater elements or piezoelectric elements. The inks having flowed into the ink chambers through some of the channels are driven by the driving unit to be ejected toward a print medium in the form of droplets from the nozzles. A droplet ejection head disclosed in Japanese Patent Laid-Open No. 2005-53117 (hereinafter referred to as Document 1) includes nozzles, ink chambers, channels, and driving units, and is formed in a joined substrate including multiple substrates. Forming this droplet ejection head involves, for example, thinning the multiple substrates and joining them with an adhesive agent.

In the technique disclosed in Document 1, the droplet ejection head is formed by joining the multiple substrates including a substrate in which many channel grooves are formed. Thus, the substrate strength is weak at regions where multiple channel grooves are formed. This leads to a possibility that the substrates break when they are joined. One may reduce the pressure to be applied to the joining surfaces of the substrates during the joining in order to avoid breakage of the substrates. Doing so, however, leads to a possibility of formation of voids on the joining surfaces. In a case where the substrates break at or around channels and/or voids are formed, there is a possibility that the functionality of the channels deteriorates. This leads to a possibility that the yield of manufacturing of the joined substrate or droplet ejection head drops.

SUMMARY OF THE DISCLOSURE

The present disclosure provides a joined substrate in which a first substrate, a second substrate, and a third substrate are joined in this order with an adhesive agent therebetween, the joined substrate comprising: one or more grooves formed in a groove region of a surface of the first substrate not facing the second substrate; and a bulging portion formed in a back region of a surface of the second substrate not facing the first substrate, the bulging portion bulging in a thickness direction, the back region corresponding to the groove region in a plane direction.

Further features of the present disclosure will become apparent from the following description of exemplary embodiments with reference to the attached drawings.

DESCRIPTION OF THE EMBODIMENTS

First Embodiment

A preferred embodiment of the present disclosure will be described below. The specific names of substances and materials expressed in the description do not particularly limit the scope of the present disclosure, but are used to fully describe the embodiment. In the present embodiment, in order to reinforce the substrate strength of a substrate in which multiple grooves are formed, the substrate thickness is increased at portions where the substrate strength would otherwise be low, thereby increasing the substrate strength. Moreover, in the present embodiment, the substrate thickness is locally adjusted so as to be able to prevent breakage and formation of voids due to the variation in substrate thickness.

Figure 1A:
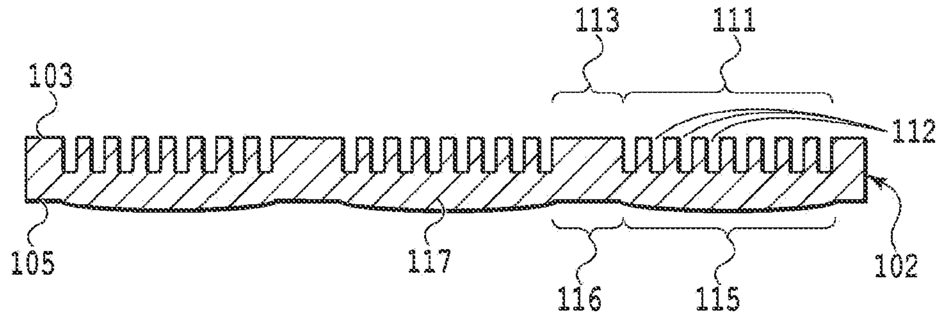
FIGS. 1A to 1C are cross-sectional views illustrating a configuration of a joined substrate according to a first embodiment.

FIG. 1A is a cross-sectional view of a thinned first substrate 102 included in a joined substrate according to the present embodiment. Referring to FIG. 1A, groove regions 111 and flat regions 113 are formed repetitively and alternately in and on a first surface 103 of the thinned first substrate 102. One or more (eight in the example of FIG. 1A) grooves 112 are formed in each groove region 111. First back surface regions 115 corresponding to the groove regions 111 and second back surface regions 116 corresponding to the flat regions 113 are repetitively and alternatively formed on a second surface 105 of the thinned first substrate 102. A bulging portion 117 bulging in the thickness direction is formed in each first back surface region 115. Here, the thickness direction is a direction orthogonal to the plane direction of the joined substrate. In the thinned first substrate 102, the largest substrate thickness at the regions where the bulging portions 117 are formed is greater than the largest substrate thickness at the flat regions 113. Forming the bulging portions 117 in the regions corresponding to the one or more grooves 112 in the plane direction makes it possible to maintain the strength of the thinned first substrate 102 although the one or more grooves 112 are formed.

In the thinned first substrate 102, the largest substrate thickness at the regions where the bulging portions 117 are formed is preferably greater than the largest substrate thickness at the flat regions 113 by about 1 [μm]. It is also preferable that the bulging portions 117 have a cross-sectional shape protruding outward in a circular arc shape.

A method of manufacturing the joined substrate according to the present embodiment will be described with reference to FIGS. 1B and 1C and FIGS. 2A to 2C.

Figure 1B:
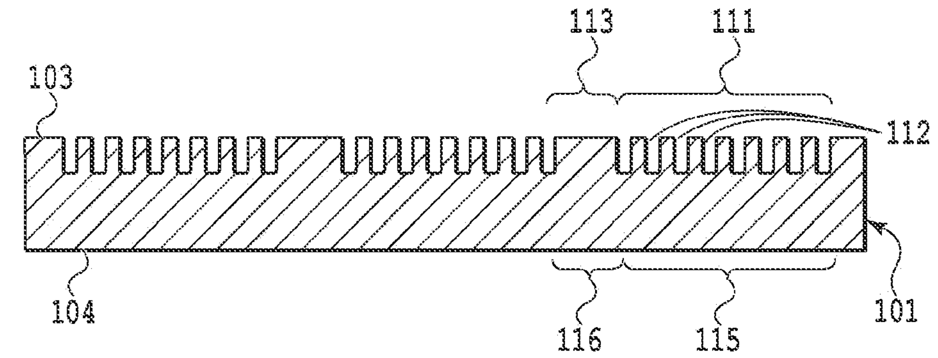

As illustrated in FIG. 1B, a first substrate 101 is prepared which has groove regions 111 and flat regions 113 repetitively formed in and on a first surface 103, one or more grooves 112 being formed in the groove regions 111. First back surface regions 115 corresponding to the groove regions 111 and second back surface regions 116 corresponding to the flat regions 113 are repetitively formed on a second surface 104 of the first substrate 101. As for the material of the first substrate 101, silicon, silicon carbide, silicon nitride, various glass substrates, and various ceramics (alumina, cermet, boron carbide, zirconia, mullite, gallium nitride, and aluminum nitride) are usable, for example. As for the method of forming the one or more grooves 112, a combination of photoresist patterning by photolithography and dry etching or wet etching, laser processing, and the like are usable.

Figure 1C:
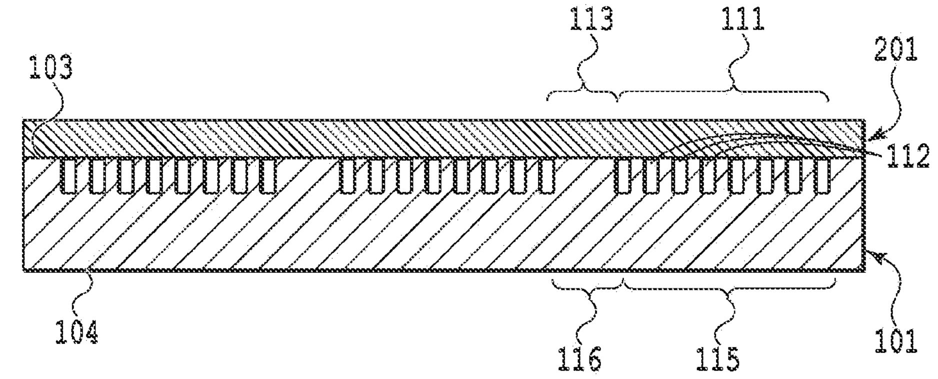

Then, as illustrated in FIG. 1C, resin tape 201 is attached to the first surface 103 of the first substrate 101 (tape attaching step). As for the material of the resin tape 201, acrylics, polypropylene, polyethylene terephthalate (PET), polyolefins, and polyimides are usable. The thickness of the tape is selectable within the range of 1 [μm] to 300 [μm]. Instead of the resin tape 201, a resin material such as a resist, wax, or adhesive agent can be used. In a case of using a liquid resin material, formation by a well-known tenting method is preferable in order to prevent the resin material from getting into the grooves 112.

Figure 2A:
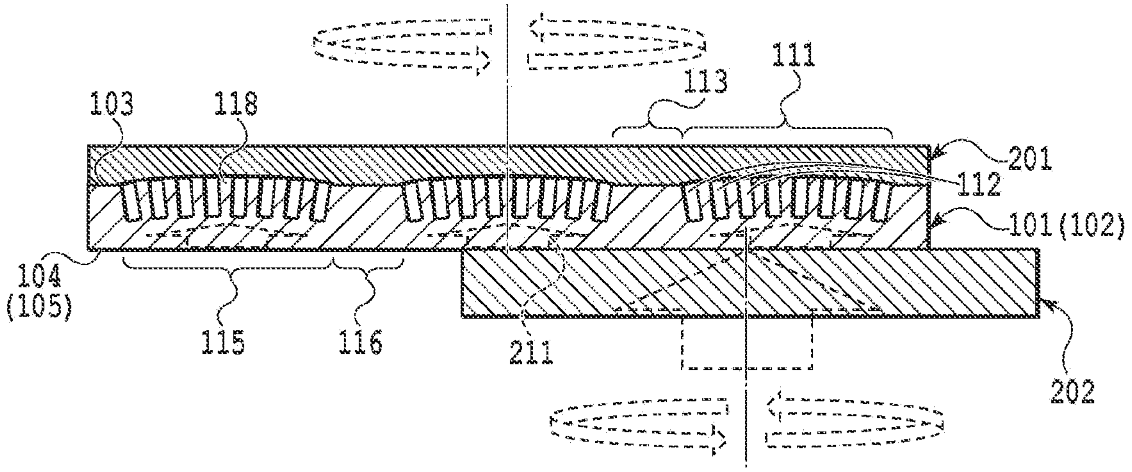
FIGS. 2A to 2C are cross-sectional views illustrating the configuration of the joined substrate according to the first embodiment.
Figure 2B:
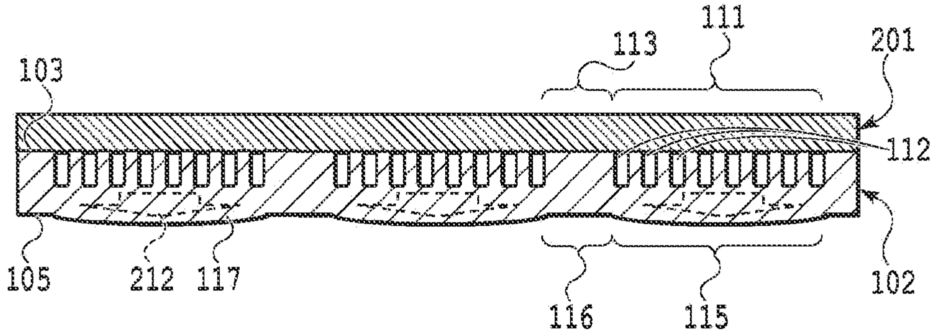

Then, as illustrated in FIG. 2A, the second surface 104 of the first substrate 101 is thinned with a grinding stone 202 to form the thinned first substrate 102 (thinning step). The thinned first substrate 102 has the thinned second surface 105. As for the method of thinning the first substrate 101, grinding with a grinding stone, grinding by dry polishing or chemical mechanical polishing (CMP), and the like are usable. In the thinning of the first substrate 101, which is a silicon substrate, the first substrate 101 and the grinding stone 202 are both spun while at the same time a pressure 211 is applied to the first substrate 101, thereby grinding the first substrate 101. The first back surface regions 115, which correspond to the groove regions 111, are fragile. Thus, as illustrated in FIG. 2A, as the grinding stone 202 applies the pressure 211 to the thinned first substrate 102 during the thinning, the portions of the thinned first substrate 102 between the groove regions 111 and the first back surface regions 115 are displaced toward the resin tape 201. This forms bulging groove portions 118. The amount of displacement of the bulging groove portions 118 is largest at their centers. The first back surface regions 115 of the second surface 105 of the thinned first substrate 102 is maintained flat while the pressure 211 is kept on the thinned first substrate 102 to thin the thinned first substrate 102. As illustrated in FIG. 2B, after the thinning, the pressure 211 from the grinding stone 202 is released, which causes internal stress release 212 inside the thinned first substrate 102. As a result, the first surface 103 of the thinned first substrate 102 becomes flat whereas the bulging portions 117 are formed at the first back surface regions 115 of the thinned first substrate 102. Here, the first back surface regions 115 are regions included in the second surface 105 and present at positions corresponding to the groove regions 111 included in the first surface 103. Since the amount of displacement of the bulging groove portions 118 is largest at their centers, the substrate thickness of the thinned first substrate 102 is largest at the centers of the bulging portions 117. Thus, the portions of the thinned first substrate 102 with the largest substrate thickness are where stresses tend to get concentrated the most. This improves the strength of the thinned first substrate 102. The substrate thickness of the thinned first substrate 102 at the portions where the bulging portions 117 are present is dependent on the amount of displacement of the thinned first substrate 102 toward the resin tape 201 during the thinning. The amount of displacement of the thinned first substrate 102 toward the resin tape 201 is determined by the balance between the fragility of the groove regions 111 of the thinned first substrate 102 and the hardness of the tape material. The wider and deeper the grooves 112 are, the more fragile the thinned first substrate 102 is. The tape's elastic modulus (hardness, resistance to elastic deformation) may be increased to reduce the amount of displacement of the thinned first substrate 102 toward the resin tape 201 during the thinning. In one example, the following occurs in a case where tape 201 with a PET substrate having an elastic modulus of 4000 [MPa] is used for a thinned first substrate 102 with one or more grooves 112 measuring 100 [μm] in width and 200 [μm] in depth. Specifically, the bulging portions 117 formed in the first back surface regions 115 corresponding to the groove regions 111 bulge about 0.8 [μm] relative to the second back surface regions 116 corresponding to the flat regions 113. In another example, the following occurs in a case where resin tape 201 with a polyvinyl chloride (PVC) fibrous substrate having an elastic modulus of 100 [MPa] is used for a thinned first substrate 102 with one or more grooves 112 measuring 10 [μm] in width and 50 [μm] in depth. Specifically, the bulging portions 117 formed at the first back surface regions 115 corresponding to the groove regions 111 bulge about 0.9 [μm] relative to the second back surface regions 116 corresponding to the flat regions 113. As described above, the bulge height of the bulging portions 117 can be controlled by selecting the hardness of the resin tape 201 as appropriate according to the shape of the grooves 112. For example, the elastic modulus of the resin tape 201 can be selected as appropriate within the range of 10^4 [Pa] to 10^8 [Pa].

Figure 2C:
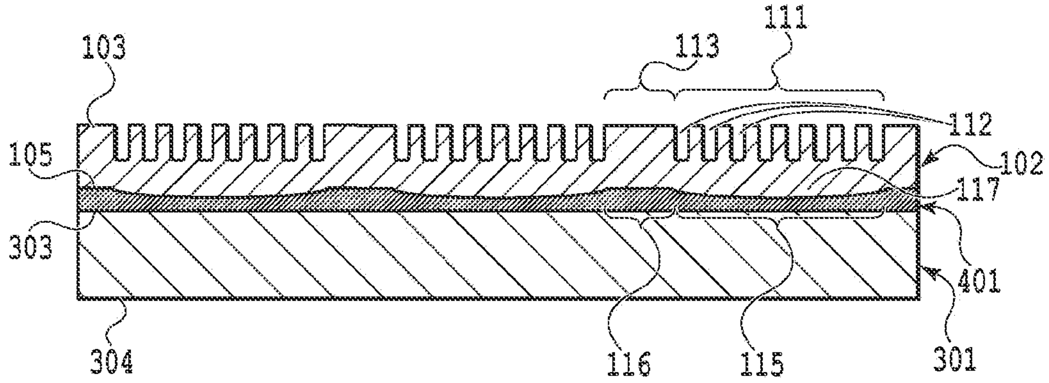

Then, as illustrated in FIG. 2C, a first adhesive agent 401 is applied to the second surface 105 of the thinned first substrate 102. Thereafter, the thinned first substrate 102 and a second substrate 301 are joined with the first adhesive agent 401 therebetween (joining step). In the joining, the first surface 103 of the thinned first substrate 102 and a second surface 304 of the second substrate 301 may be pressed with two flat pressing plates.

Next, advantageous effects of providing the bulging portions 117 in the configuration illustrated in FIG. 2C will be described. First, providing the bulging portions 117 brings about a void elimination effect. Specifically, in the present embodiment, the bulging portions 117 are provided at the first back surface regions 115 corresponding to the groove regions 111, in which one or more grooves 112 are formed. This prevents formation of voids between the thinned first substrate 102 and the second substrate 301. In a case where voids are formed around the first back surface regions 115 corresponding to the groove regions 111, the voids can be moved to positions around the second back surface regions 116 corresponding to the flat regions 113. More specifically, as illustrated in FIG. 2C, the boundary plane between the thinned first substrate 102 and the adhesive agent 401 is inclined to have vertices at the tips of the bulging portions 117. Thus, when the thinned first substrate 102 and the second substrate 301 are bonded with the adhesive agent 401, the adhesive agent 401 can easily flow toward the peripheries of the bulging portions 117 from the tips of the bulging portions 117. As the adhesive agent 401 flows, the voids flow toward the peripheries of the bulging portions 117 from the tips of the bulging portions 117. Hence, in a case where voids are formed between the thinned first substrate 102 and the second substrate 301 around the bulging portions 117, those voids move to positions outward of the bulging portions 117 between the thinned first substrate 102 and the second substrate 301.

Providing the bulging portions 117 also improves the strength of the thinned first substrate 102, as described earlier. This prevents the thinned first substrate 102 from breaking when the thinned first substrate 102 and the second substrate 301 are joined with the adhesive agent 401.

Note that, in a case where the bulging portions 117 are too tall, voids may be easily formed and the thinned first substrate 102 may easily break when the thinned first substrate 102 and the second substrate 301 are joined with the adhesive agent 401. In a case where the bulging portions are too large, then, when the substrates are joined with the adhesive agent, the adhesive agent contacts the substrates such that gaps are formed before the bulging portions exert the effect of eliminating the adhesive agent. In this way, the gaps can be a cause of formation of voids. The above problems, however, can be prevented by setting the height of the bulging portions 117 to less than a predetermined value. The thickness of the adhesive agent 401 is about 1 [μm] in the state where the joined substrate is completed. Thus, the height of the bulging portions 117 is preferably 1 [μm] or less.

From the viewpoint of the void elimination effect, the shape of the bulging portions 117 is important as well. Ina case where voids are formed on the bonding layer made of the adhesive agent 401 when the thinned first substrate 102 and the second substrate 301 are joined with the adhesive agent 401, it is preferable to move the voids smoothly in the direction toward the peripheries of the bulging portions 117 from their tips. In the present embodiment, this is achieved by rendering the bulging portions 117 in a cross-sectional shape protruding outward in a circular arc shape (round shape). The bulging portions 117 are rendered in the round shape by rendering the bulging groove portions 118 in around shape in the thinning of the first substrate 101 as illustrated in FIG. 2A.

Second Embodiment

Figure 3:
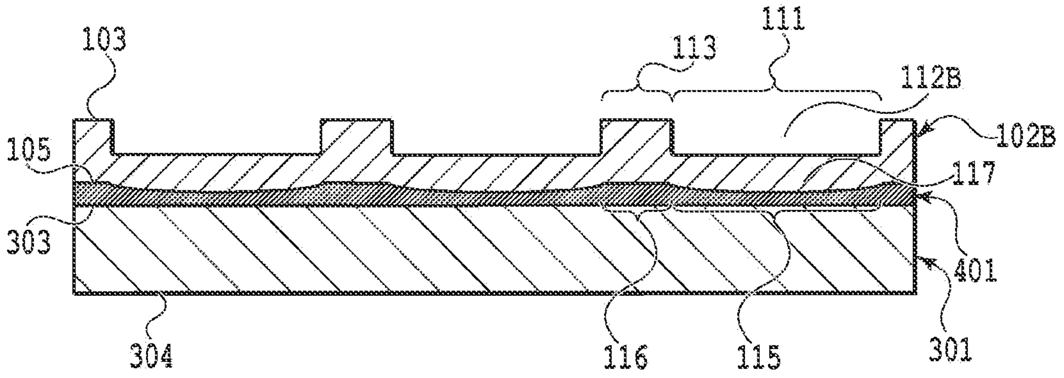
FIG. 3 is a cross-sectional view illustrating a configuration of a joined substrate according to a second embodiment.

In the first embodiment, multiple grooves 112 are formed in the groove regions 111, as illustrated in FIG. 2C. In a second embodiment, as illustrated in FIG. 3, a single groove 112B is formed in each groove region 111 of a thinned first substrate 102B. The joined substrate and the method of manufacturing the same according to the present embodiment are similar to those in the first embodiment, and iterated description thereof is therefore omitted.

Third Embodiment

Figure 4A:
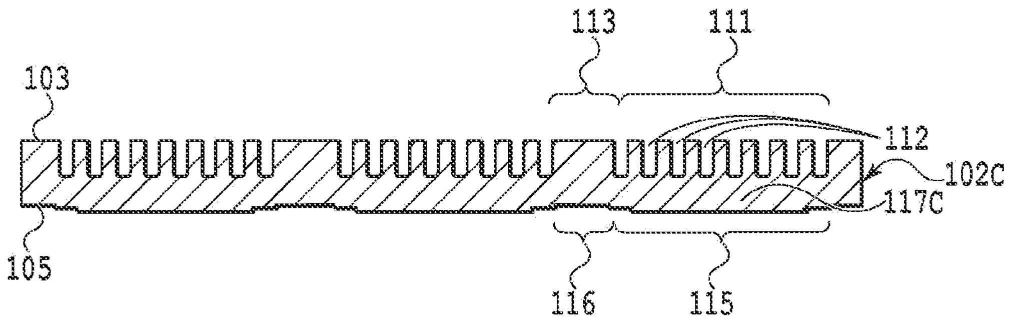
FIGS. 4A and 4B are cross-sectional views illustrating a configuration of a joined substrate according to a third embodiment.

FIG. 4A is a cross-sectional view of a thinned first substrate 102C included in a joined substrate according to a third embodiment. As illustrated in FIG. 4A, the thinned first substrate 102C according to the present embodiment includes bulging portions 117C bulging stepwise in the thickness direction. Here, the thickness direction is a direction orthogonal to the plane direction of the joined substrate. The stepwise bulging portions 117C are provided in first back surface regions 115. Here, the first back surface regions 115 are region included in a second surface 105 and present at positions corresponding to groove regions 111 included in a first surface 103.

In the present embodiment, the first substrate is thinned before one or more grooves are formed. For this reason, bulging portions are not formed in the thinning of the first substrate. In the case of such a substrate, the stepwise bulging portions 117C can be formed by resist patterning by photolithography and a boring process such as dry etching or wet etching. As illustrated in FIG. 4A, the stepwise bulging portions 117C preferably have a cross-sectional shape that becomes thicker stepwise from the periphery toward the center from the viewpoint of improving the strength of the thinned first substrate 102C. Like the thinned first substrate 102 according to the first embodiment, the thinned first substrate 102C according to the present embodiment have one or more grooves 112 formed in the groove regions 111 in the first surface 103. Moreover, the stepwise bulging portions 117C are formed in the corresponding first back surface regions 115. In this way, the bulging portions 117C remedy the fragility due to the grooves 112 and improves the strength.

By joining the thinned first substrate 102C according to the present embodiment to a second substrate 301 with an adhesive agent 401, it is possible to form a joined substrate that has overcome the fragility due to the grooves.

Figure 4B:
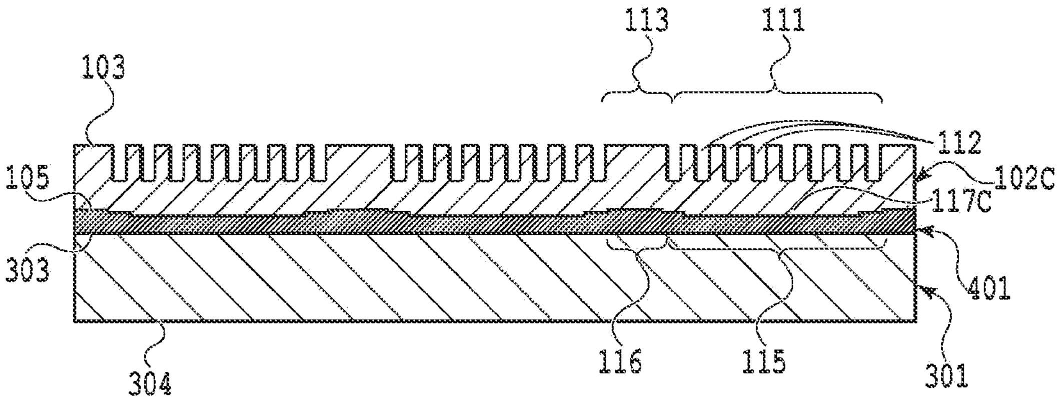

The adhesive agent 401 is applied to the second surface 105 of the thinned first substrate 102C illustrated in FIG. 4A. Then, the thinned first substrate 102C and the second substrate 301 are joined with the adhesive agent 401 therebetween to form a two-layer joined substrate as illustrated in FIG. 4B.

Fourth Embodiment

Figure 5:
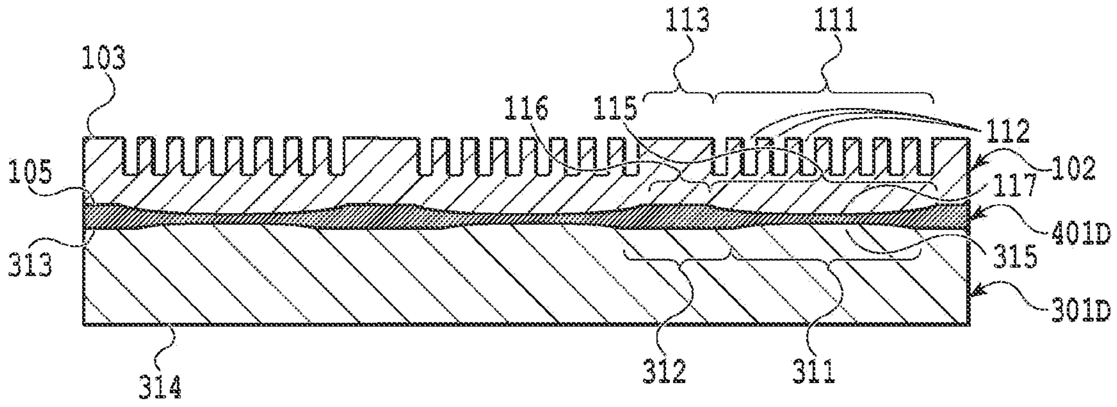
FIG. 5 is a cross-sectional view illustrating a configuration of a joined substrate according to a fourth embodiment.

FIG. 5 is a cross-sectional view of a joined substrate according to a fourth embodiment. A thinned first substrate 102 according to the present embodiment is similar to the thinned first substrate 102 according to the first embodiment. Unlike the second substrate 301 according to the first embodiment, a second substrate 301D according to the present embodiment is provided with bulging portions 315 bulging in the thickness direction on a first surface 313. Here, the thickness direction is a direction orthogonal to the plane direction of the joined substrate. The bulging portions 315 are provided such that the tips of the bulging portions 315 and the tips of the bulging portions 117 of the thinned first substrate 102 face each other in a state where the thinned first substrate 102 and the second substrate 301D are joined with an adhesive agent 401D.

Grooves (not illustrated) and the bulging portions 315 are formed in and on the second substrate 301D by using the method of forming the grooves 112 and the bulging portions 117 on the first substrate 101 in the first embodiment. Thereafter, the surface in which the grooves are formed is planarized. In this way, the second substrate 301D having the bulging portions 315 is formed. Stepwise bulging portions can be formed on the second substrate 301D by using the method of forming the stepwise bulging portions 117C on the thinned first substrate 102C in the second embodiment.

According to the present embodiment, the joining surface between the thinned first substrate 102 and the adhesive agent 401D is inclined, and the joining surface between the second substrate 301D and the adhesive agent 401D is inclined. In this way, the thickness of the adhesive agent 401D changes to a greater extent than in the first embodiment. Accordingly, the void elimination effect is greater than in the first embodiment.

Fifth Embodiment

Figure 6A:
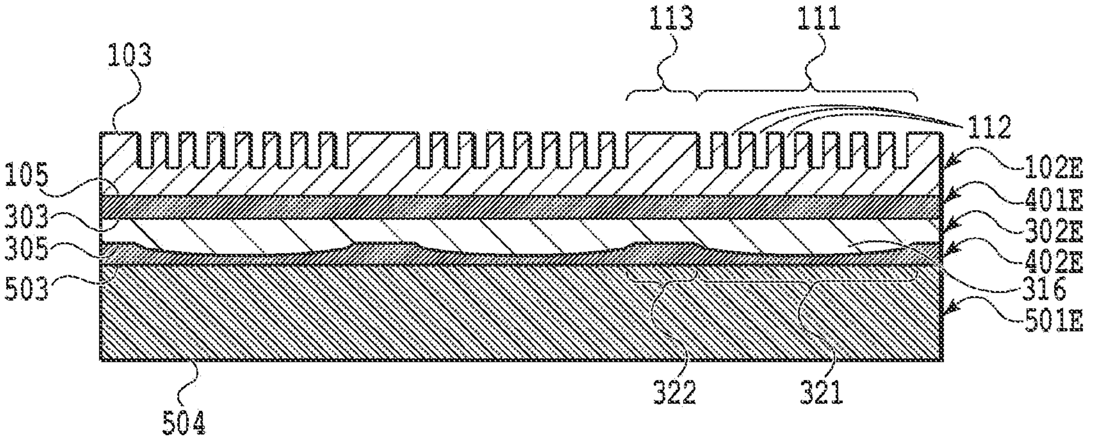
FIGS. 6A to 6C are cross-sectional views illustrating a configuration of a joined substrate according to a fifth embodiment.

FIG. 6A is a cross-sectional view of a joined substrate according to a fifth embodiment. The joined substrate according to the present embodiment is obtained by joining three substrates with adhesive agents. Specifically, the joined substrate according to the present embodiment is obtained by joining a thinned first substrate 102E, a thinned second substrate 302E, and a third substrate 501E in this order with an adhesive agent 401E and an adhesive agent 402E.

In the first embodiment, the thinned first substrate 102 is formed, as illustrated in FIG. 2C. On the other hand, in the present embodiment, the thinned second substrate 302E is formed, as illustrated in FIG. 6A. In the first embodiment, as illustrated in FIG. 1A, the bulging portions 117 bulging in the thickness direction are provided on the second surface 105 of the thinned first substrate 102. Here, the thickness direction is a direction orthogonal to the plane direction of the joined substrate. On the other hand, in the present embodiment, bulging portions 316 bulging in the thickness direction are provided on a second surface 305 of the thinned second substrate 302E, as illustrated in FIG. 6A.

A method of manufacturing a joined substrate as illustrated in FIG. 6A according to the present embodiment will be described below with reference to FIGS. 6B and 6C.

Figure 6B:
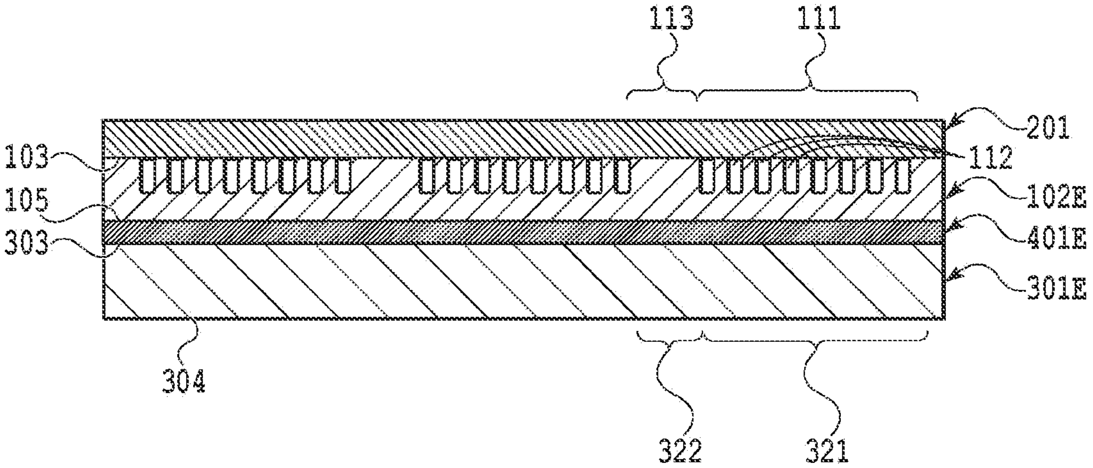

As illustrated in FIG. 6B, a second surface of the thinned first substrate 102E, which is a substrate 102E having one or more (eight in the example of FIG. 6B) grooves 112 in each groove region 111, and a first surface of a second substrate 301E are joined with the adhesive agent 401E (first joining step). Then, resin tape 201 is attached to a first surface 103 of the thinned first substrate 102E (tape attaching step).

Figure 6C:
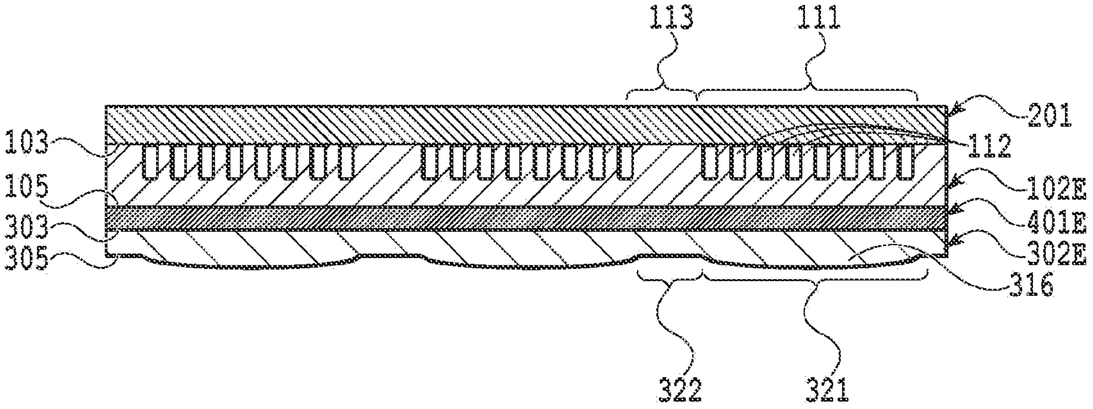

Then, the second substrate 301E is thinned from the second surface 304 to make a joined substrate as illustrated in FIG. 6B into a joined substrate as illustrated in FIG. 6C (thinning step). Here, in the process of thinning the second substrate 301E from the second surface 304, bulging portions (not illustrated) are formed on the first surface 103 of the first substrate 102E and a first surface 303 of the thinned second substrate 302E. After the thinning, the pressure from the grinding stone is released. As a result, the bulging portions (not illustrated) formed on the first surface 303 of the first surface 103 turn into the bulging portions 316 formed in first secondary back surface regions 321 of the second surface 305 as illustrated in FIG. 6C. The second secondary back surface regions 322 remain flat. The first secondary back surface regions 321 are regions included in the second surface 305 of the second substrate 302E and corresponding to the groove regions 111. The second secondary back surface regions 322 are regions included in the second surface 305 of the second substrate 302E and corresponding to flat regions 113.

Then, the adhesive agent 402E is applied to the second surface 305 of the second substrate 302E. Thereafter, the thinned second substrate 302E and the third substrate 501E are joined with the adhesive agent 402E to form a three-layer joined substrate as illustrated in FIG. 6A (second joining step). In the joining, the first surface 103 of the thinned first substrate 102E and a second surface 504 of the third substrate 501E may be pressed with two flat pressing plates.

In the present embodiment, the bulging portions 316 are provided in the first secondary back surface regions 321 corresponding to the groove regions 111, in which one or more grooves 112 are formed. This prevents formation of voids between the thinned second substrate 302E and the third substrate 501E. Even in a case where voids are formed on the joining surface in the first secondary back surface regions 321 corresponding to the groove regions 111, the voids can be moved to the joining surface in the second secondary back surface regions 322 corresponding to the flat regions 113. More specifically, as illustrated in FIG. 6A, the boundary plane between the thinned second substrate 302E and the adhesive agent 402E is inclined to have vertices at the tips of the bulging portions 316. Thus, when the thinned second substrate 302E and the third substrate 501E are bonded with the adhesive agent 402E, the adhesive agent 402E can easily flow toward the peripheries of the bulging portions 316 from the tips of the bulging portions 316. As the adhesive agent 402E flows, the voids flow toward the peripheries of the bulging portions 316 from the tips of the bulging portions 316. Thus, in a case where voids are formed on the bonding layer around the bulging portions 316, those voids move to positions outward of the bulging portions 316.

Providing the bulging portions 316 also improves the strength of the thinned second substrate 302E. This prevents the thinned second substrate 302E from breaking when the thinned second substrate 302E and the third substrate 501E are joined with the adhesive agent 402E.

Note that, in a case where the bulging portions 316 are too tall, voids may be easily formed, and the thinned second substrate 302E may easily break when the thinned second substrate 302E and the third substrate 501E are joined with the adhesive agent 402E. The above problems, however, can be prevented by setting the height of the bulging portions 316 to less than a predetermined value.

Sixth Embodiment

Figure 7:
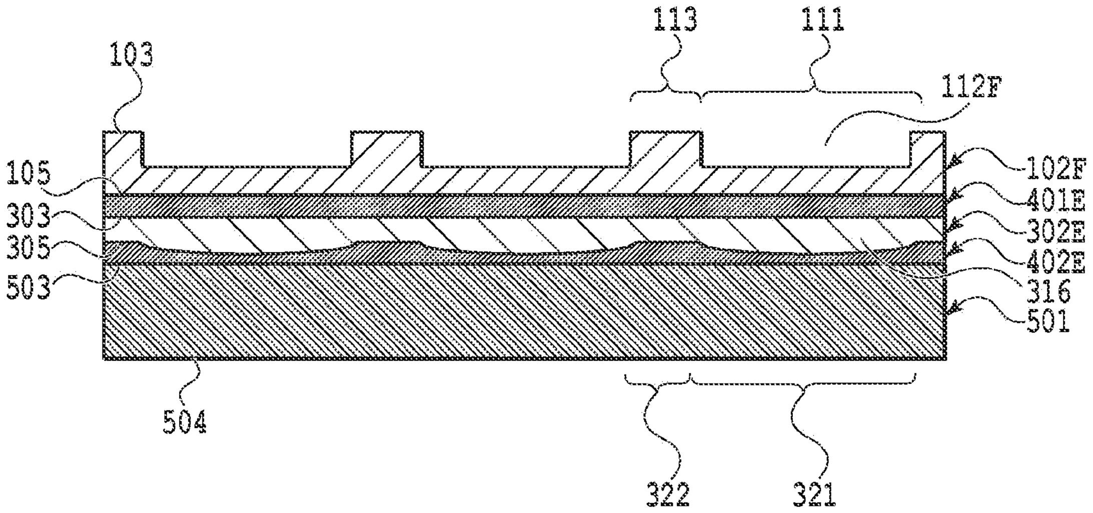
FIG. 7 is a cross-sectional view illustrating a configuration of a joined substrate according to a sixth embodiment.

In the fifth embodiment, multiple grooves 112 are formed in the groove regions 111, as illustrated in FIG. 6A. In a sixth embodiment, as illustrated in FIG. 7, a single groove 112F is formed in each groove region 111 of a thinned first substrate 102F. The joined substrate and the method of manufacturing the same according to the present embodiment are similar to those in the fifth embodiment, and iterated description thereof is therefore omitted.

Seventh Embodiment

Figure 8A:
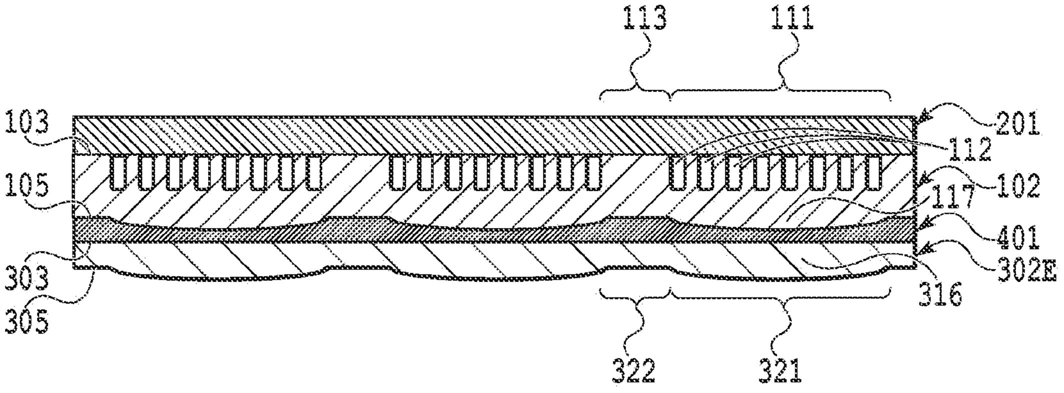
FIGS. 8A and 8B are cross-sectional views illustrating a configuration of a joined substrate according to a seventh embodiment.
Figure 8B:
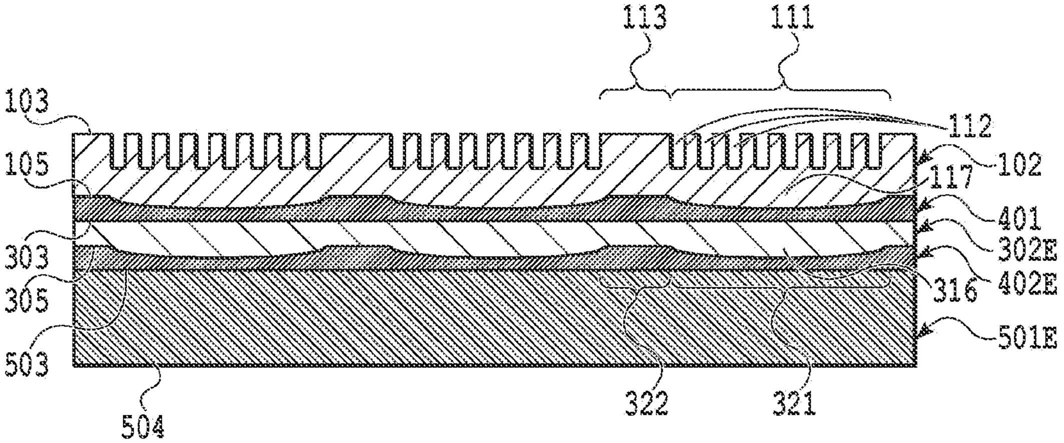

The second surface 105 of the thinned first substrate 102E in the fifth embodiment is flat. This is because the grooves 112 are formed after the thinned first substrate 102E is formed. Conversely, in a seventh embodiment, a first substrate is thinned after grooves 112 are formed in the first substrate. In this way, a thinned first substrate 102 as illustrated in FIG. 1A is formed. Then, the thinned first substrate 102 as illustrated in FIG. 1A and a second substrate are joined with an adhesive agent to form a two-layer joined substrate as illustrated in FIG. 2C. Then, as in the fifth embodiment, the second substrate included in the two-layer joined substrate as illustrated in FIG. 2C is thinned from its second surface. As a result, the two-layer joined substrate illustrated in FIG. 8A is formed. The two-layer joined substrate illustrated in FIG. 8A is such that bulging portions 117 bulging in the thickness direction are formed on the thinned first substrate 102, and bulging portions 316 bulging in the thickness direction are formed on the thinned second substrate 302E. Here, the thickness direction is a direction orthogonal to the plane direction of the joined substrate. Then, an adhesive agent 402E is applied to the second surface 305 of the thinned second substrate 302E. Thereafter, the thinned second substrate 302E and a third substrate 501E are joined with the adhesive agent 402E. As a result, the three-layer joined substrate illustrated in FIG. 8B is formed.

According to the present embodiment, the bulging portions 117 are formed on the thinned first substrate 102, and also the bulging portions 316 are formed on the thinned second substrate 302E. This remedies the fragility due to the formation of the grooves 112.

Moreover, a void elimination effect is achieved on the bonding layer made of an adhesive agent 401, and a void elimination effect is achieved also on the bonding layer made of the adhesive agent 402E.

Eighth Embodiment

A joined substrate according to an eighth embodiment is a three-layer joined substrate as in the fifth embodiment. The following differences can be understood by comparing the cross-sectional view of the joined substrate according to the fifth embodiment illustrated in FIG. 6A and the cross-sectional view of the joined substrate according to the eighth embodiment illustrated in FIG. 9A. In a thinned first substrate 102G included in the joined substrate according to the present embodiment, hollow portions 114 are bored which are open to a second surface 105 of the thinned first substrate 102G. Bulging portions 318 bulging in the thickness direction are formed in third secondary back surface regions 323 of a second surface 305 of a thinned second substrate 302G corresponding to the hollow portions 114. Here, the thickness direction is a direction orthogonal to the plane direction of the joined substrate. The eighth embodiment is similar to the fifth embodiment in that one or more grooves 112 are formed in a first surface 103 of the thinned first substrate 102G and bulging portions 316 are formed on the second surface 305 of the thinned second substrate 302G.

Figure 9A:
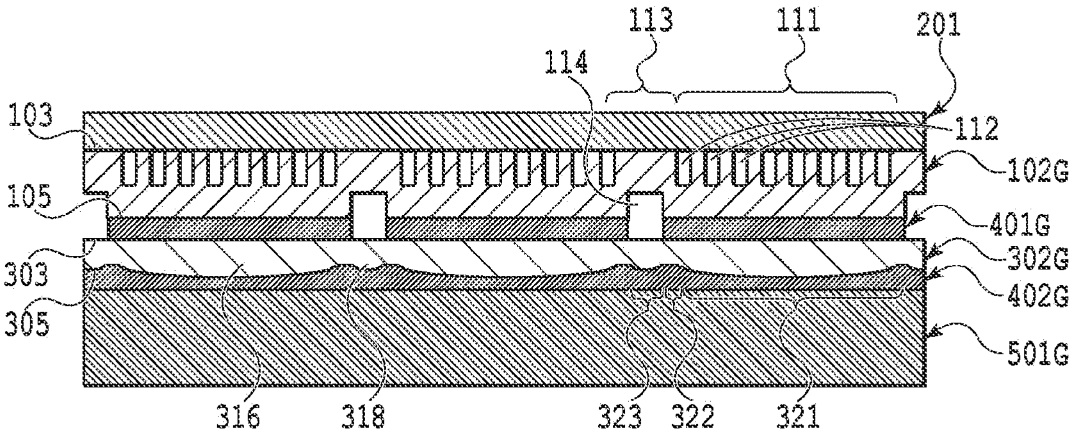
FIGS. 9A to 9C are cross-sectional views illustrating a configuration of a joined substrate according to an eighth embodiment.
Figure 9B:
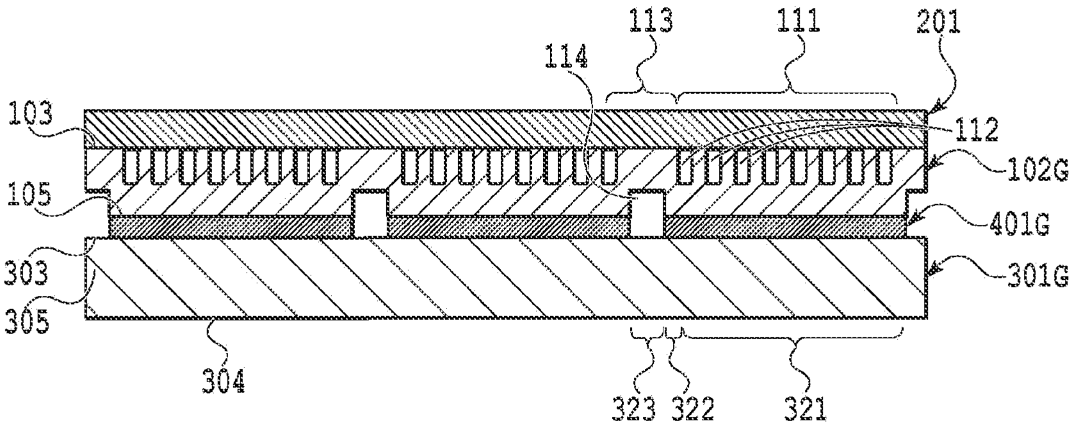

To manufacture the joined substrate according to the present embodiment, first, the thinned first substrate 102G and a second substrate 301G are joined with an adhesive agent 401G, as illustrated in FIG. 9B. Then, resin tape 201 is attached to the first surface 103 of the thinned first substrate 102G.

Figure 9C:
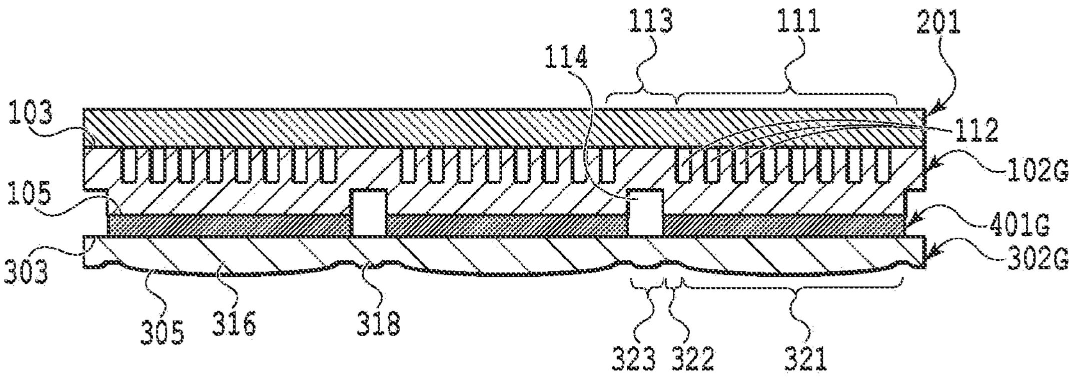

Then, the second substrate 301G is thinned from its second surface 304. As a result, the bulging portions 316 and 318 are formed on the second surface 305 of the thinned second substrate 302G, as illustrated in FIG. 9C. The bulging portions 316 are formed in the first secondary back surface regions 321 while the bulging portions 318 are formed in the third secondary back surface regions 323. The first secondary back surface regions 321 are regions present in the second surface 305 of the thinned second substrate 302G and corresponding to groove regions 111. The third secondary back surface regions 323 are regions present in the second surface 305 of the thinned second substrate 302G and corresponding to the hollow portions 114. Flat regions 113 present in the first surface 103 of the thinned first substrate 102G are regions facing neither the groove regions 111 nor the hollow portions 114. Second secondary back surface regions 322 are regions present in the second surface of the thinned second substrate 302G and corresponding to the flat regions 113. No bulging portion is formed at the second secondary back surface regions 322. Thus, the second secondary back surface regions 322 are flat.

An adhesive agent is applied to the second surface 305 of the thinned second substrate 302G included in the two-layer joined substrate illustrated in FIG. 9C. Thereafter, the thinned second substrate 302G and a third substrate are joined with the adhesive agent. As a result, a three-layer joined substrate as illustrated in FIG. 9A is manufactured.

Here, the principle of the formation of the bulging portions 316 on the thinned second substrate 302G by a process of thinning the second substrate 301G with a grinding stone is as described earlier. The principle of the formation of the bulging portions 318 on the thinned second substrate 302G by the process of thinning the second substrate 301G with a grinding stone will be described next.

Figure 10A:
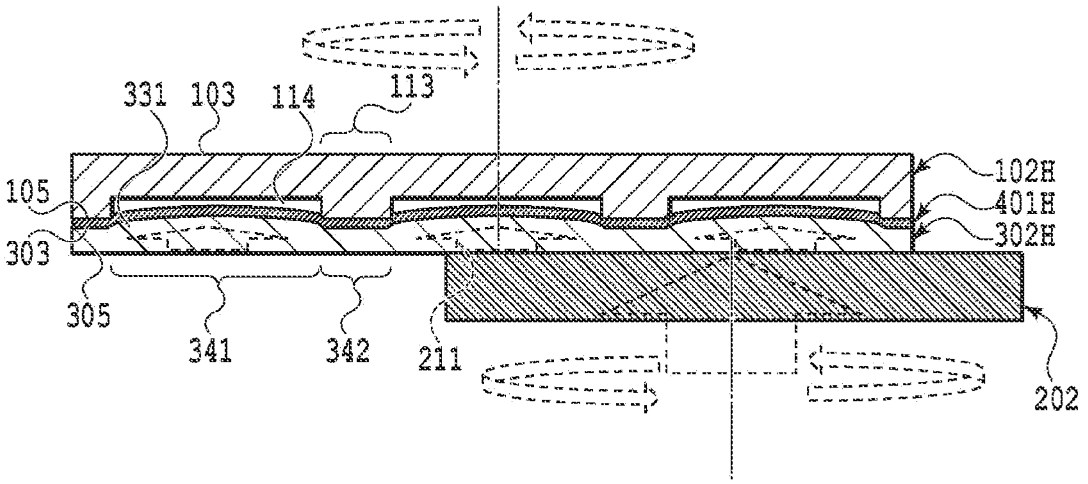
FIGS. 10A and 10B are cross-sectional views explaining the principle of a method of manufacturing the joined substrate according to the eighth embodiment.
Figure 10B:
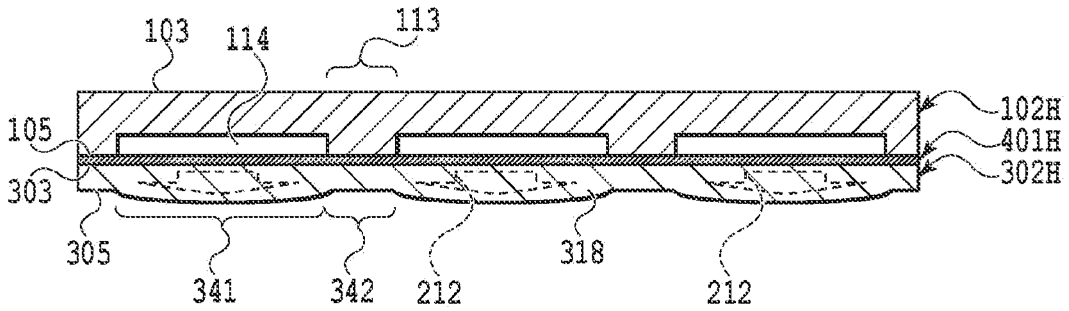

Referring to FIG. 10A, in the thinning of the second substrate, which is a silicon substrate, the joined substrate and the grinding stone are both spun while at the same time a pressure 211 is applied to the second surface 305 of the joined substrate. As the grinding stone 202 applies the pressure 211 to the joined substrate in the thinning, the pressure 211 is applied to a second surface 305 of a thinned second substrate 302H. At regions 342, a second surface 105 of a thinned first substrate 102H supports the first surface facing it, so that no bending occurs. On the other hand, at regions 341, at which the hollow portions 114 are present, the second surface 105 of the thinned first substrate 102H does not support the first surface facing it. Thus, the second substrate 302H bends at portions corresponding to the regions 341, thereby forming bulging portions 331. The second surface of the thinned second substrate 302H remains flat. After the thinning ends, and the grinding stone 202 is separated from the joined substrate, the internal stress is released, so that the bulging portions 331 disappear and the bulging portions 318 are formed instead, as illustrated in FIG. 10B. The bulge height of the bulging portions 331 is largest at around the centers of the regions where the hollow portions 114 are formed. Accordingly, the bulge height of the bulging portions 318 is largest at around the centers of the regions where the hollow portions 114 are formed. The bulge height of the bulging portions 318 is determined by the bulge height of the bulging portions 331 formed during the thinning. This bulge height can be adjusted according to the intensity of the pressure 211 which the second substrate receives from the grinding stone during the thinning.

As illustrated in FIG. 9A, part of the bulging portions 318 originating from the hollow portions 114 can escape into the hollow portions 114 when the thinned second substrate 302G and a third substrate 501G are joined with an adhesive agent 402G. Thus, the bulging portions 318 may bulge higher than the bulging portions 316 before the joining.

Assume that the largest substrate thickness at the regions where the bulging portions 316 originating from the one or more grooves 112 are present is A. Moreover, assume that the largest substrate thickness at the regions where the bulging portions 318 originating from the hollow portions 114 is B. Furthermore, assume that the substrate thickness of the flat regions 113 is C. In this case, the substrate thicknesses at the bulging portions 316 and 318 are greater than the substrate thickness at the flat regions, so that C>A and B>A. Since part of the bulging portions 318 originating from the hollow portions 114 escape into the hollow portions 114 as described above, B may be greater than A (B>A).

The difference between the largest substrate thickness at the regions where the one or more grooves 112 are formed and the substrate thickness at the flat regions is preferably 1.0 [μm] or less. The difference between the largest substrate thickness at the regions where the hollow portions 114 are formed and the substrate thickness at the flat regions is preferably 2.0 [μm] or less.

Incidentally, the two-layer joined substrates and three-layer joined substrates according to the embodiments described above will be used for droplet ejection heads, for example. Specifically, the two-layer joined substrates and three-layer joined substrates according to the above-described embodiments will be used as components to be included in a droplet ejection head, for example. In such a case, the one or more grooves formed in the groove regions (referred to also as "predetermined regions" or "first predetermined regions") will be used as liquid channels (e.g., the supply-side common channels and collection-side common channels in Examples 1 and 2 to be described later). Moreover, in such a case, the hollow portions opening to regions, which are present in the surface opposite from the surface where the flat regions (referred to also as "second predetermined regions") are present and correspond to the flat regions, will be used as accommodation chambers to accommodate the driving units in the Examples 1 and 2 to be described later. Note that the joined substrates may have a configuration in which hollow portions are provided which are open to the surface opposite from the surface where the one or more grooves are formed. In such a case, the groove regions are the first predetermined regions and also the second predetermined regions. The two-layer joined substrates and three-layer joined substrates according to the above-described embodiments may be used for purposes other than for droplet ejection heads.

Example 1

A droplet ejection head including a joined substrate will be exemplarily described. Note that the example to be described below represents one technically preferable example and does not particularly limit the scope of the present disclosure. The droplet ejection head is a member included in a printing apparatus, such as an inkjet printer. The printing apparatus also includes liquid storage units that store liquids to be supplied to the droplet ejection head, a conveyance mechanism that conveys print media to be printed, and so on.

Figure 11A:
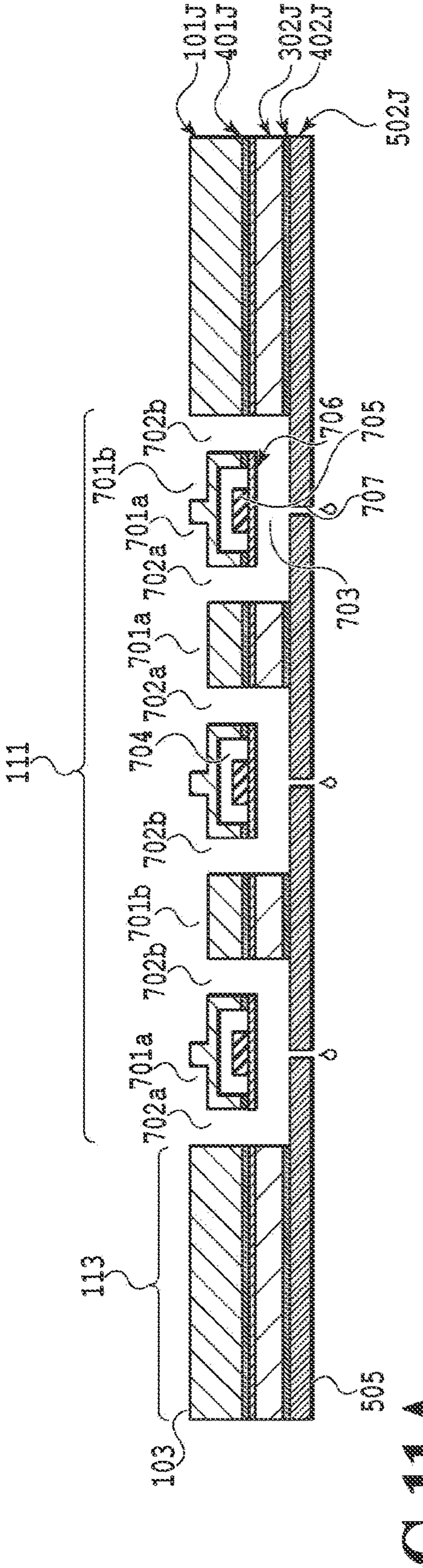
FIGS. 11A and 11B are a cross-sectional view and a plan view illustrating a configuration of a joined substrate according to an example.
Figure 11B:
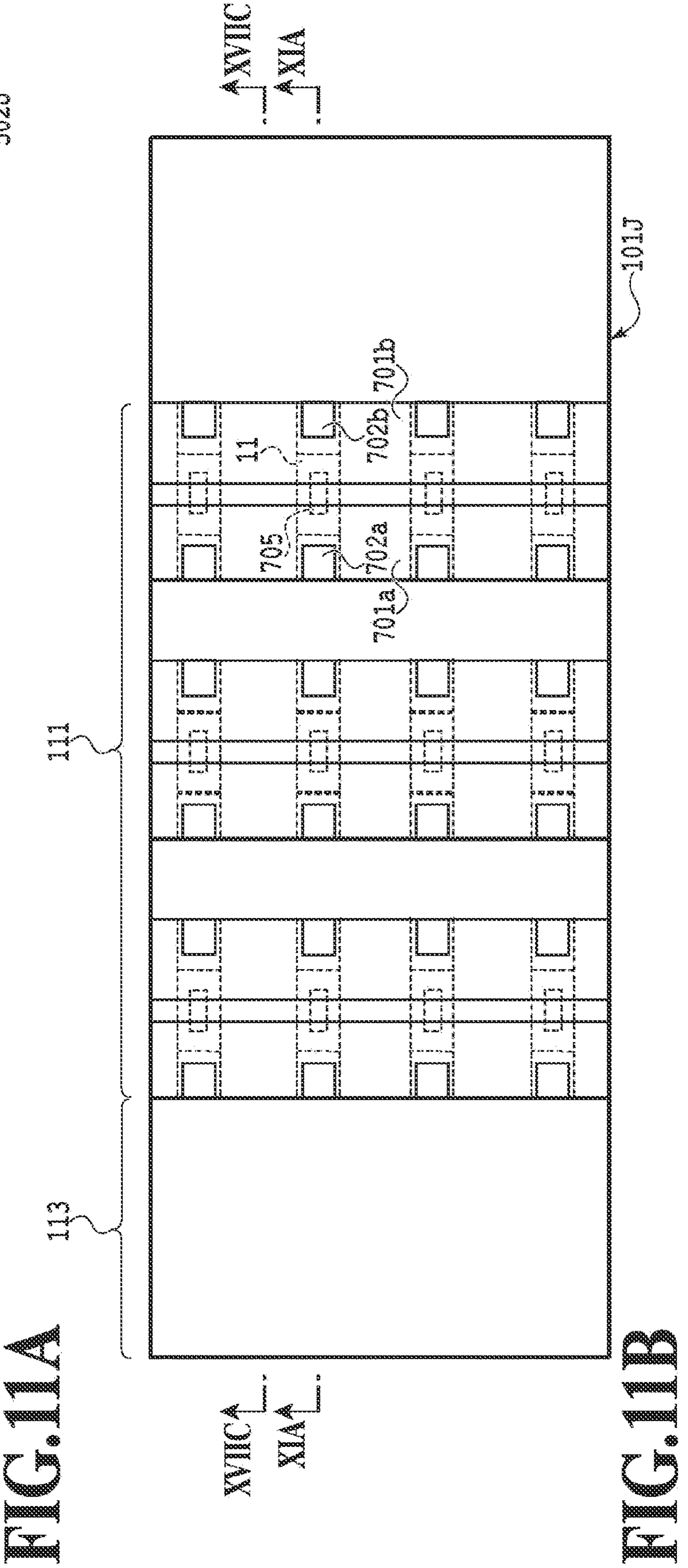
Figure 12:
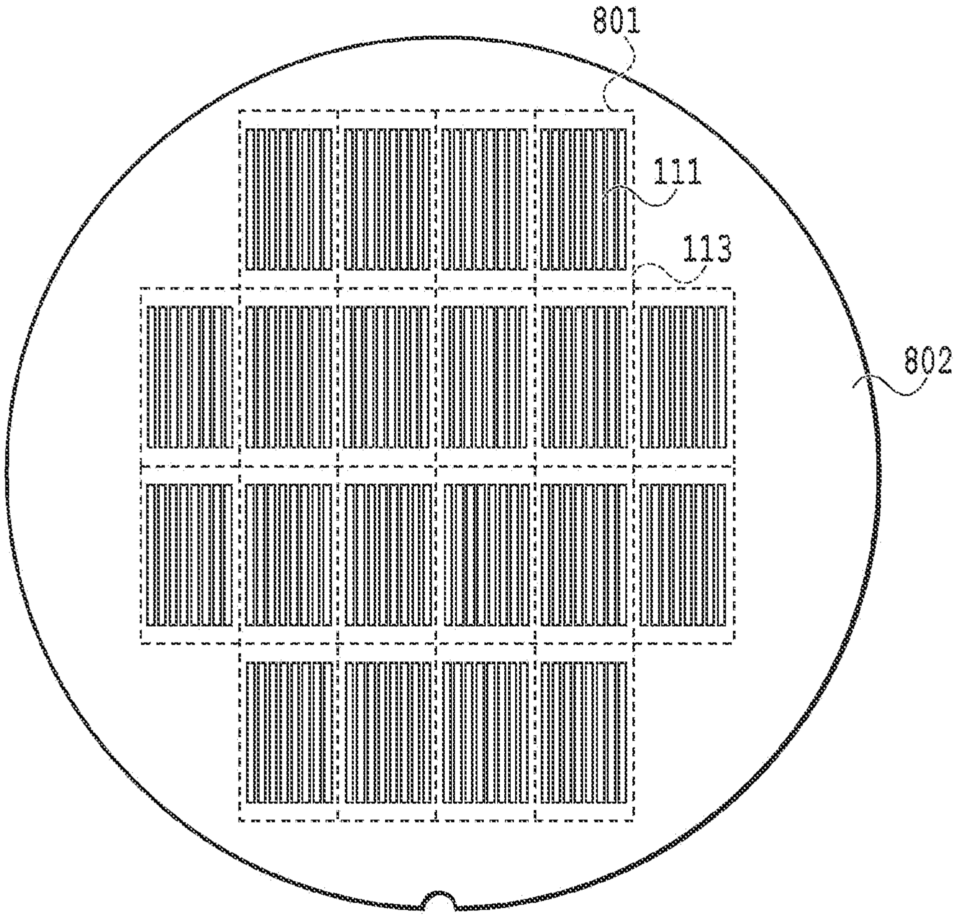
FIG. 12 is a plan view illustrating a configuration of a wafer in which joined substrates according to the example are arranged in arrays.

The droplet ejection head according to the present example illustrated in FIGS. 11A and 11B is formed by laminating multiple plate members. FIG. 11A illustrates a cross-sectional view of the droplet ejection head, and FIG. 11B illustrates a top view of the droplet ejection head. FIG. 12 illustrates a plan view of droplet ejection heads arranged in arrays as chips in a wafer surface.

In FIGS. 11A and 11B, reference sign 101J denotes a first substrate, reference sign 302J denotes a second substrate, reference sign 502J denotes a third substrate, reference sign 401J denotes a first adhesive agent, and reference sign 402J denotes a second adhesive agent. Moreover, reference sign 701*a* denotes a supply-side common channel formed in the first substrate's first surface 103, and reference sign 701*b* denotes a collection-side common channel formed in the first substrate's first surface 103. These are multiple grooves 112 formed in a groove region 111 and each function as a supply-side common channel or a collection-side common channel. Reference sign 702*a* denotes a supply-side individual channel formed in the first substrate 101J, and reference sign 702*b* denotes a collection-side individual channel formed in the first substrate 101J. Reference sign 703 denotes a pressure chamber formed in the thinned second substrate 302J, reference sign 704 denotes a hollow portion formed in the first substrate 101J, reference sign 705 denotes a piezoelectric element (referred to also as "driving unit"), reference sign 706 denotes an insulating film functioning as a vibration film, and reference sign 707 denotes an ink ejection port. Reference sign 113 denotes a flat region.

A configuration of an inkjet head as an example of the droplet ejection head will be described below.

An ink ejection mechanism will be described with reference to FIGS. 11A and 11B. One or more (four in the example of FIG. 11A) grooves are formed in each groove region 111 in the first surface 103 of the first substrate 101J. The grooves function as the supply-side common channels 701*a* for inks or the collection-side common channels 701*b* for inks which are alternately arrayed. Moreover, in the first substrate 101J, the hollow portions 704 are formed, which open to a second surface 105 of the first substrate 101J. The piezoelectric elements 705 are accommodated in the hollow portions 704. Since the hollow portions 704 accommodate the piezoelectric elements 705 serving as driving units, it can be understood that the hollow portions 704 are used as accommodation chambers for accommodating the driving units. Furthermore, there are provided through-holes penetrating between part of the bottoms of the grooves 112 and the second surface 105 of the first substrate 101J. Each of the through-holes communicating with the supply-side common channels 701*a* functions as a supply-side individual channel 702*a*. Each of the through-holes communicating with the collection-side common channels 701*b* functions as a collection-side individual channel 702*b*. A silicon substrate measuring 400 [μm] to 750 [μm] in thickness is used as the first substrate 101J. The multiple grooves 112, which are the supply-side common channels 701*a* and the collection-side common channels 701*b*, are formed by exposing and developing a positive resist on the first surface 103 of the first substrate 101J and then performing Si dry etching.

The first substrate 101J is joined to the thinned second substrate 302J with the first adhesive agent 401J therebetween. On and in the thinned second substrate 302J, there are formed the piezoelectric elements 705, an electric wiring layer (not illustrated) for driving the piezoelectric elements 705, and the insulating films 706 functioning as vibration films for transmitting changes in the volumes of the piezoelectric elements 705 to the pressure chambers 703. The thinned second substrate 302J and the insulating films 706 are a silicon-on-insulator (SOI) substrate including a device layer and a buried oxide (BOX) layer, which is processed to form a layer that serves as the insulating films 706. A lead zirconate titanate (PZT) film, for example, is usable for the piezoelectric elements 705. Thus, the piezoelectric elements 705 are made of sintered metal oxide crystals.

The piezoelectric elements 705 will be accommodated in the hollow portions 704 of the first substrate 101J when the first substrate 101J and the thinned second substrate 302J are joined with the first adhesive agent 401J therebetween. The supply-side common channels 701*a* and the collection-side common channels 701*b* formed in the first substrate 101J are connected to an ink circulation apparatus (not illustrated). Inks supplied from the ink circulation apparatus are supplied to the pressure chambers 703 through the supply-side common channels 701*a* and the supply-side individual channels 702*a*. A second surface 305 of the thinned second substrate 302J (the opposite surface to a first surface 303 joined to the first substrate 101J with the adhesive agent 401J therebetween) is joined to a first surface 503 of the thinned third substrate 502J with the adhesive agent 402J therebetween. The ink ejection ports 707 are formed in the thinned third substrate 502J. The ink ejection ports 707 communicate with the pressure chambers 703. In response to application of a voltage to the piezoelectric elements 705, the piezoelectric elements 705 changes their volumes due to the piezoelectric effect. This vibrates the insulating films 706. Part of the inks having flowed into the pressure chambers 703 gets ejected through the ink ejection ports 707 by the vibration of the insulating films 706. The part of the inks not ejected from the pressure chambers 703 through the ink ejection ports 707 is collected by the ink circulation apparatus through the collection-side individual channels 702*b* and the collection-side common channels 701*b*.

A chip configuration will be described with reference to FIG. 12. Inkjet head chips 801 each formed by joining the first substrate 101J, the thinned second substrate 302J, and the third substrate 502J as described above are arranged in arrays in a wafer 802. One or more grooves 112 are formed in the groove regions 111 in each inkjet head chip 801, and the flat regions 113 are formed in marginal regions between the inkjet head chips 801.

Next, a method of manufacturing an inkjet head according to the present disclosure will be described with reference to FIGS. 13A to 13C, FIGS. 14A to 14C, FIGS. 15A to 15C, FIGS. 16A to 16C and FIGS. 17A and 17B. The holes and grooves are formed by patterning by general photolithography and dry etching unless otherwise noted. A silicon substrate is used as the substrate.

Figure 13A:
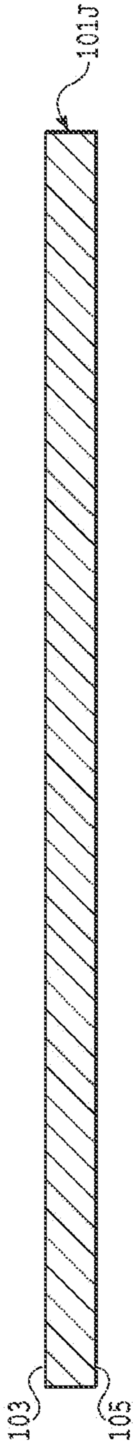
FIGS. 13A to 13C are cross-sectional views illustrating a configuration of a joined substrate according to the example.
Figure 13B:
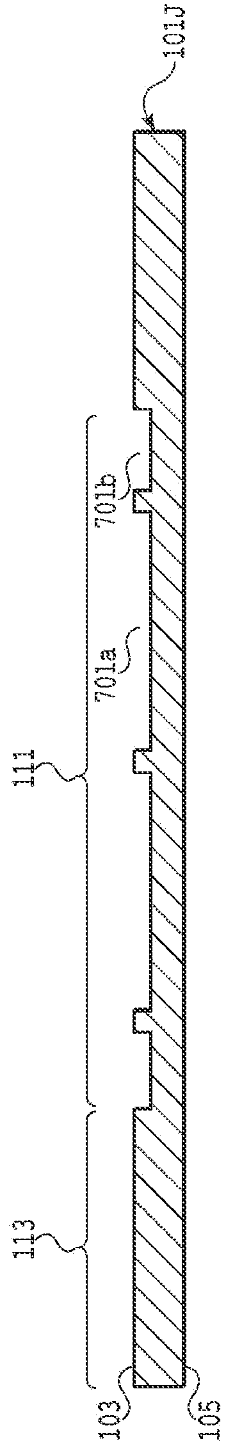
Figure 13C:
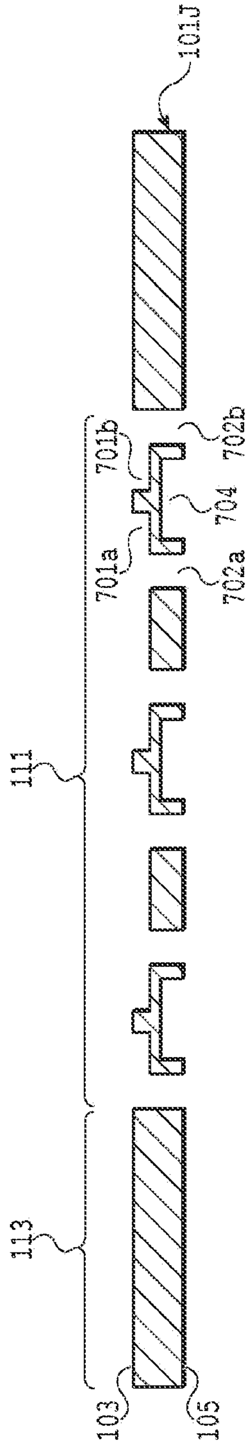

Referring to FIG. 13A, a first substrate 101J is prepared which is an 8-inch silicon substrate (thickness: 625 [μm]) having a first surface 103 and a second surface 105. Then, as illustrated in FIG. 13B, one or more (four in the example of FIG. 13B) grooves 112 (see FIG. 1A) which will serve as supply-side common channels 701*a* and collection-side common channels 701*b* are formed in the first surface 103 of the first substrate 101J. Of each pair of adjacent grooves 112, one groove is a supply-side common channel 701*a* while the other is a collection-side common channel 701*b*. The portions not formed as groove regions 111 remain as flat regions 113. Then, as illustrated in FIG. 13C, supply-side individual channels 702*a*, collection-side individual channels 702*b*, and hollow portions 704 are formed in the first substrate 101J from the second surface 105 side. The supply-side individual channels 702*a* are through-holes bored in the first substrate 101J so as to penetrate between part of the bottoms of the supply-side common channels 701*a* and the second surface 105 (first through-holes). Similarly, the collection-side individual channels 702*b* are through-holes bored in the first substrate 101J so as to penetrate between part of the bottoms of the collection-side common channels 701*b* and the second surface 105 (first through-holes). Of each pair of first through-holes, one first through-hole functions as a supply-side individual channel 702*a* while the other functions as a collection-side individual channel 702*b*. At this time, multiple supply-side individual channels 702*a* are formed so as to communicate with a common supply-side common channel 701*a*, and multiple collection-side individual channels 702*b* are formed so as to communicate with a common collection-side common channels 701*b*. Forming the supply-side common channels 701*a*, the collection-side common channels 701*b*, the supply-side individual channels 702*a*, the collection-side individual channels 702*b*, and the hollow portions 704 involves exposure with an exposure apparatus and development with a development apparatus to pattern a resist. In the resist patterning, the collection-side common channels 701*b* and the supply-side individual channels 702*a* are made with 150 [μm] lines and spaces. Then, dry etching is performed over the resist by using a plasma obtained by electrically discharging an $O_2$ gas and a $CF_4$ gas. As a result, one or more (four in the example of FIG. 13C) grooves 112 are formed which will function as supply-side common channels 701*a* and collection-side common channels 701*b* measuring 150 [μm] in width.

Figure 14A:
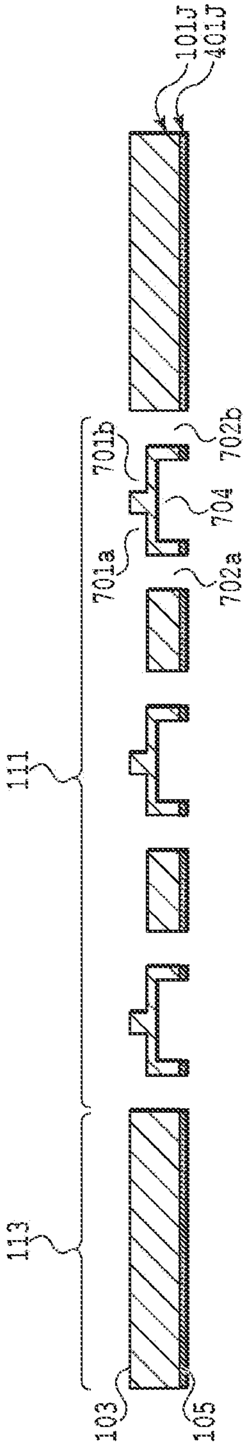
FIGS. 14A to 14C are cross-sectional views illustrating the configuration of the joined substrate according to the example.

Then, as illustrated in FIG. 14A, a first adhesive agent 401J is applied to the second surface 105 of the first substrate 101J. The adhesive is applied by transferring the adhesive onto the exposed surface of the second surface 105 of the first substrate 101J using a general adhesive transfer device. For example, a benzocyclobutene resin solution is used as the adhesive agent. The application thickness is 3 [μm]. Thereafter, the first substrate is baked under conditions of 100 [° C.] and 4 [min], thus making the solvent in the adhesive agent vaporize.

Figure 14B:
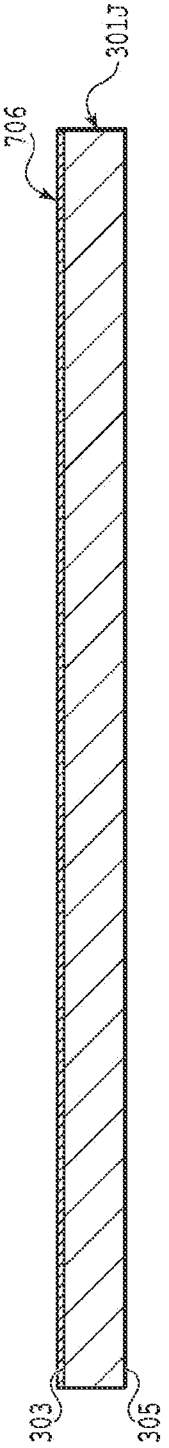
Figure 14C:
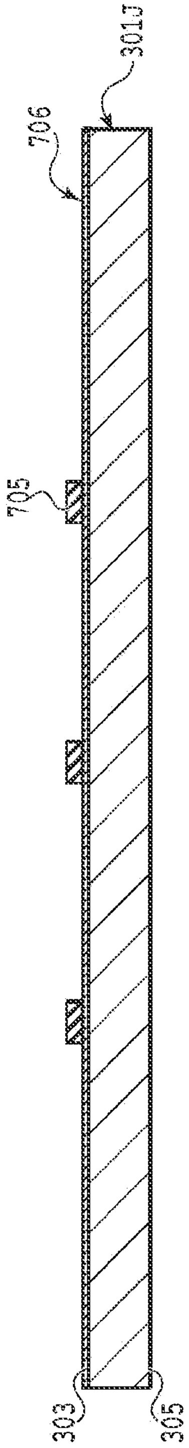
Figures 15A, 15B, 15C:
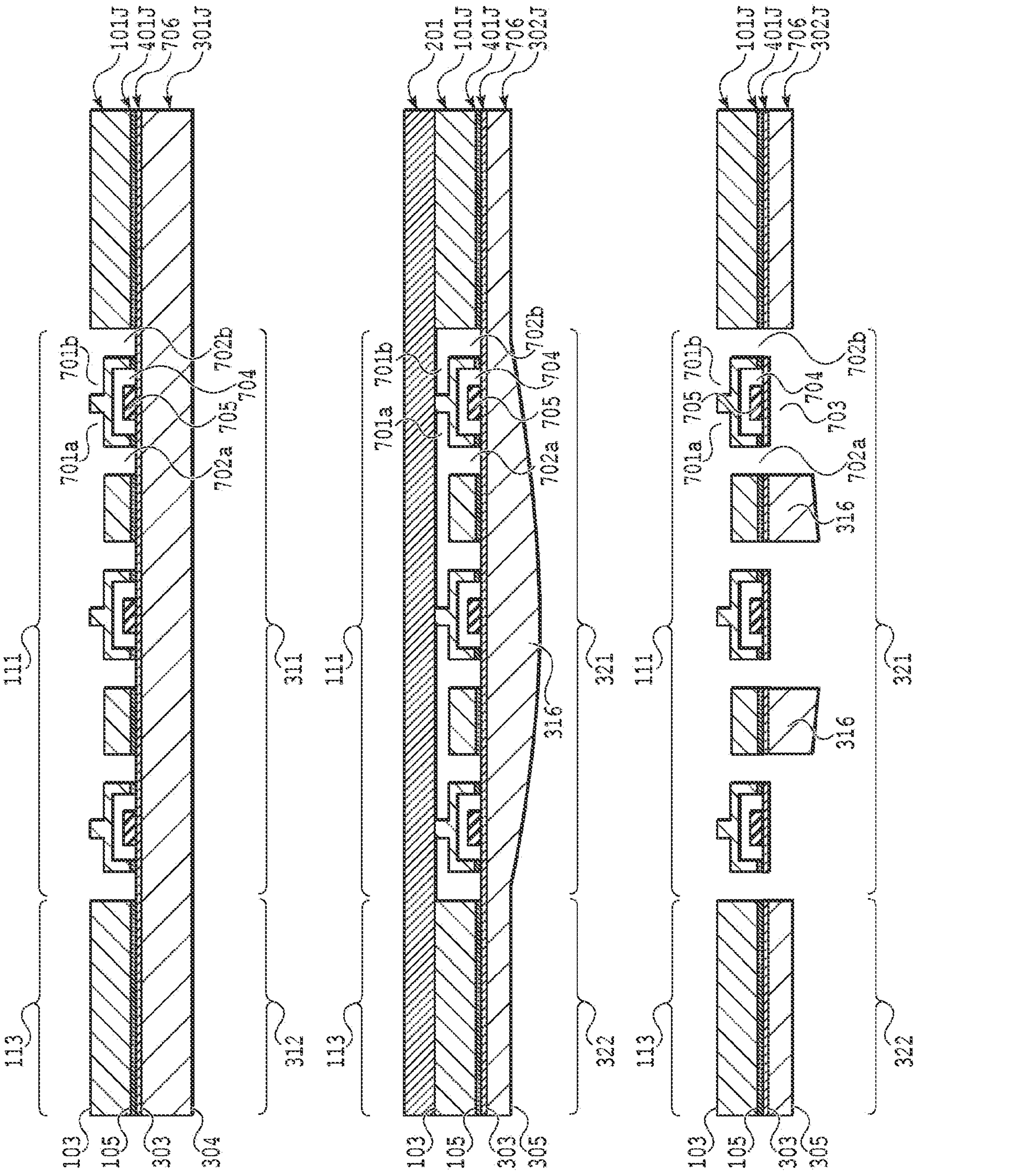
FIGS. 15A to 15C are cross-sectional views illustrating the configuration of the joined substrate according to the example.

Then, a second substrate 301J is prepared in a separate process. As illustrated in FIG. 14B, it is an 8-inch silicon substrate (thickness: 625 [μm]) having a first surface 303 on which is formed an insulating film 706 that will function as vibration films. For example, a thermal silicon oxide film is used as the insulating film 706. Then, as illustrated in FIG. 14C, piezoelectric elements 705 which will function as actuators for ink ejection are formed on the insulating film 706 formed on the first surface 303 of the second substrate 301J. On each piezoelectric element 705, an electrode layer (not illustrated) for applying a voltage to the piezoelectric element 705 is formed. Then, as illustrated in FIG. 15A, the second surface 105 of the first substrate 101J and the first surface 303 of the second substrate 301J are joined to form a two-layer joined substrate. Here, the first adhesive agent 401J applied to the second surface 105 of the first substrate 101J is joined to the insulating film 706 formed on the second substrate 301J. At this time, first secondary back surface regions 321 in the second substrate 301J corresponding to the groove regions 111 including the supply-side common channels 701*a* and the collection-side common channels 701*b* are defined. Moreover, second secondary back surface regions 322 in the second substrate 301J corresponding to the flat regions 113 are defined. A generally known substrate joining apparatus may be used for the substrate joining. For example, the first and second substrates 101J and 301J are aligned with each other using a joining-alignment apparatus and are temporarily fixed by pressurizing end portions of the wafer 802 at two positions with clamps. The temporarily fixed sample is placed inside a joining apparatus, in which the temperature is raised to 150 [° C.] and the substrates are pressurized and joined at a pressure of 3000 [N] for 5 [min] in a vacuum. The sample is then cooled and taken out of the joining apparatus. Thereafter, the sample is subjected to a separate heat treatment at 250 [° C.] for 1 hour in an oven with a nitrogen atmosphere to be cured.

Then, as illustrated in FIG. 15B, a resin tape 201 is attached to the first surface 103 of the first substrate 101J, and the second surface 305 of the second substrate 301J in the two-layer joined substrate is thinned to a predetermined substrate thickness to form a thinned second substrate 302J. For example, a tape with a PET substrate on which an acrylic adhesive is formed in a thickness of 10 [μm] is used as the resin tape 201. The elastic modulus of the PET substrate to be used is, for example, 1×10^7 [Pa]. The thinning can be performed using a generally known back surface grinding-polishing apparatus. For example, the thinning is performed with a pressure 211 during the thinning (see FIG. 2A) set at 30 [kPa] by using a grinding-polishing thinning apparatus which performs a combination of back surface grinding and chemical mechanical polishing. As a result, bulging portions 316 bulging in the thickness direction are formed in the first secondary back surface regions 321 of the thinned second substrate 302J corresponding to the one or more grooves 112 (see FIG. 1A) to be utilized as the supply-side common channels 701*a* and the collection-side common channels 701*b*. Here, the thickness direction is a direction orthogonal to the plane direction of the joined substrate. Accordingly, the largest substrate thickness at the first secondary back surface regions 321 of the thinned second substrate 302J corresponding to the groove regions 111 is larger by 0.8 [μm] than the thickness of the second secondary back surface regions 322 of the thinned second substrate 302J corresponding to the flat regions 113. Note that the illustration of the height of the bulging portions 316 in FIG. 15 is exaggerated for the sake of explanation, and the actual bulging portions 316 are shorter than those.

Then, as illustrated in FIG. 15C, the resin tape 201 is peeled off. Moreover, through-holes which will be pressure chambers 703 (second through-holes) are bored in the thinned second substrate 302J in the two-layer joined substrate from the second surface 305 of the thinned second substrate 302J.

The pressure chambers 703 are formed by exposing and developing a positive resist on the second surface 305 of the thinned second substrate 302J and then performing Si dry etching. Thereafter, $SiO_2$ dry etching is performed without the positive resist detached. As a result, the supply-side individual channels 702*a* and the pressure chambers 703 communicate with each other, and the collection-side individual channels 702*b* and the pressure chambers 703 communicate with each other.

Figures 16A, 16B, 16C:
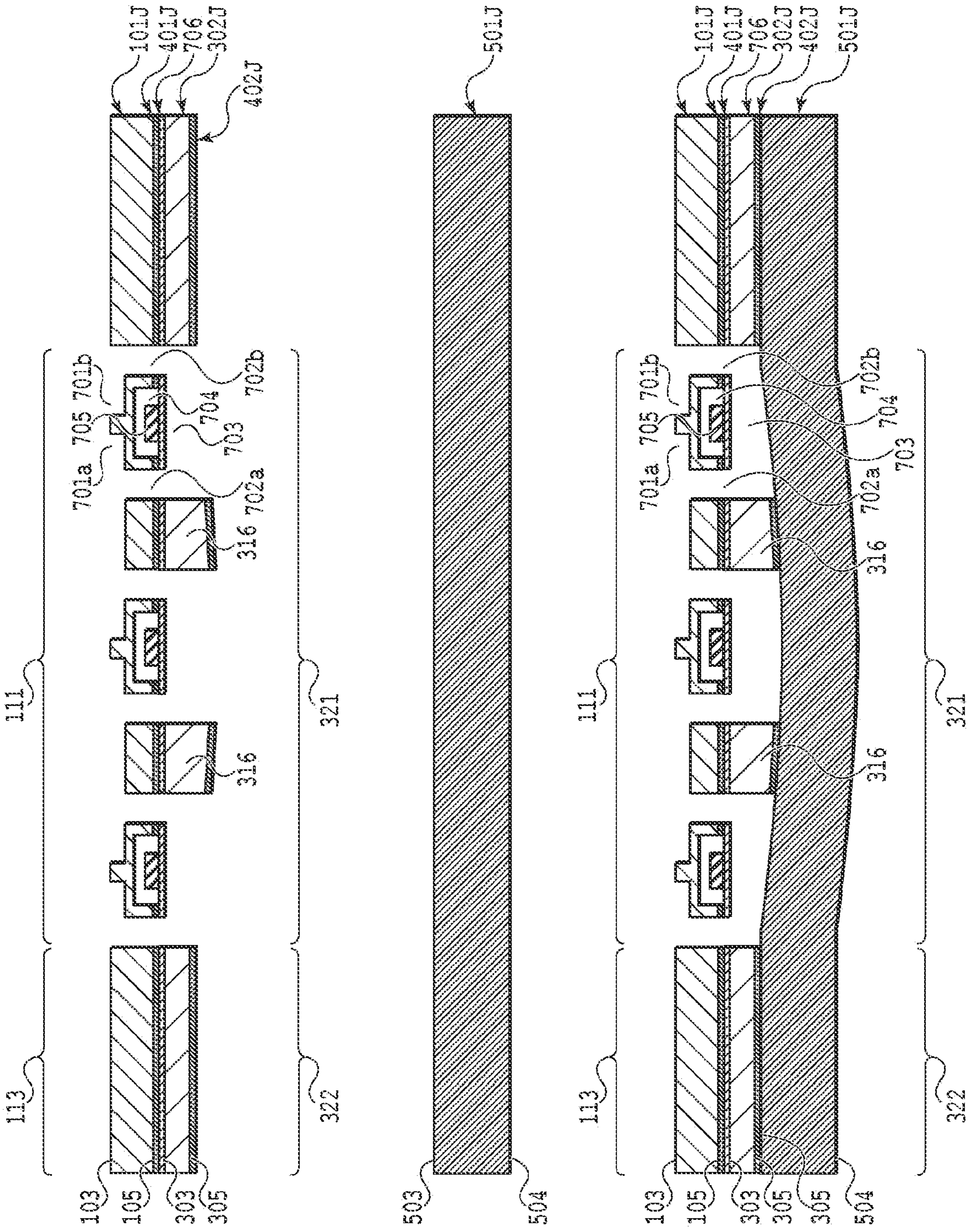
FIGS. 16A to 16C are cross-sectional views illustrating the configuration of the joined substrate according to the example.
Figure 17A:
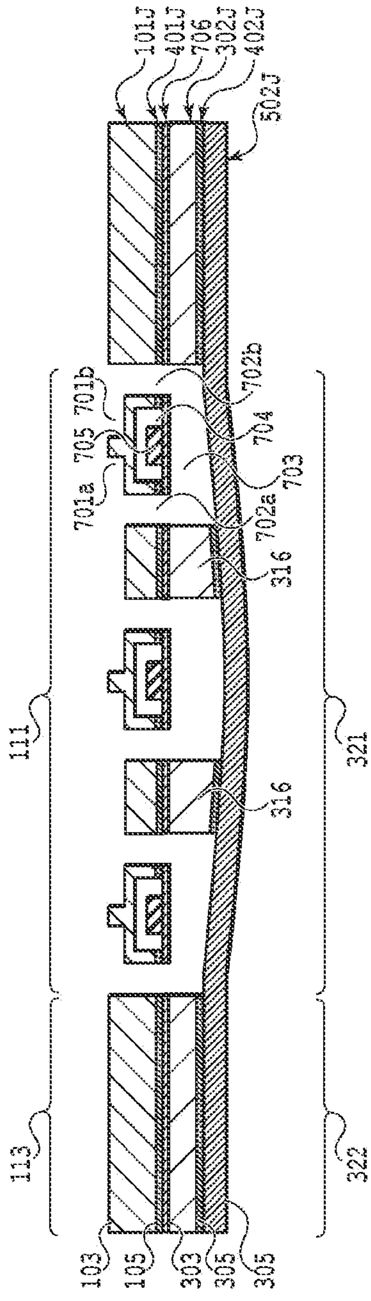
FIGS. 17A to 17C are cross-sectional views illustrating the configuration of the joined substrate according to the example.

Then, as illustrated in FIG. 16A, a second adhesive agent 402J is applied to the second surface 305 of the thinned second substrate 302J in the two-layer joined substrate. The adhesive agent 402J is applied by a similar method to the method illustrated in FIG. 14A. Then, as illustrated in FIG. 16B, a third substrate 501J is prepared in a separate process. Then, as illustrated in FIG. 16C, the second surface 305 of the thinned second substrate 302J and a first surface 503 of the third substrate 501J are joined to form a three-layer joined substrate. At this time, the second adhesive agent 402J applied to the second surface 305 of the thinned second substrate 302J is joined to the first surface 503 of the third substrate 501J. Then, as illustrated in FIG. 17A, a second surface 504 (see FIG. 16C) of the third substrate 501J in the three-layer joined substrate is thinned to a predetermined substrate thickness to form a thinned third substrate 502J. The method of thinning the third substrate 501J is similar to the method of thinning the second substrate 301J. Specifically, a resin tape 201 is attached to the first surface 103 of the first substrate 101J, and then the third substrate 501J is thinned from the second surface 504 using a back surface grinding-polishing apparatus.

Figure 17B:
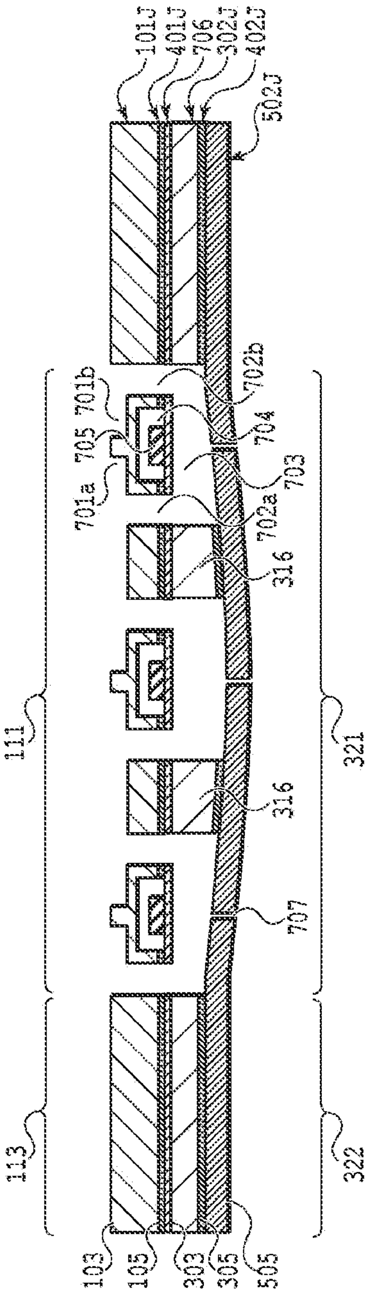

The bulging portions 316 (see FIG. 15B) made as a result of forming the thinned second substrate 302J by thinning the second substrate 301J remain even with the pressure chambers 703 formed (see FIG. 15C). The bulging portions 316 also remain even with the adhesive agent 402J applied (see FIG. 16A). FIG. 16C illustrates a state where the thickness of the adhesive agent 402J is constant and the third substrate 501J is bent by the bulging portions 316. The thickness of the thinned third substrate 502J will be uniform as illustrated in FIG. 17A on condition that this bend is canceled out by the upward deformation of the third substrate 501J by the pressure received by the second surface 504 from the back surface grinding-polishing apparatus in the thinning of the third substrate 501J. Then, as illustrated in FIG. 17B, ink ejection ports (third through-holes) 707 for ink ejection are bored in the thinned third substrate 502J in the three-layer joined substrate from a second surface 505 of the thinned third substrate 502J. The ink ejection ports 707 are formed by exposing and developing a positive resist on the second surface of the thinned third substrate 502J and then performing Si dry etching.

Next, a void elimination effect achieved by providing the bulging portions 316 in the configuration illustrated in FIG. 17B will be described.

Figure 17C:
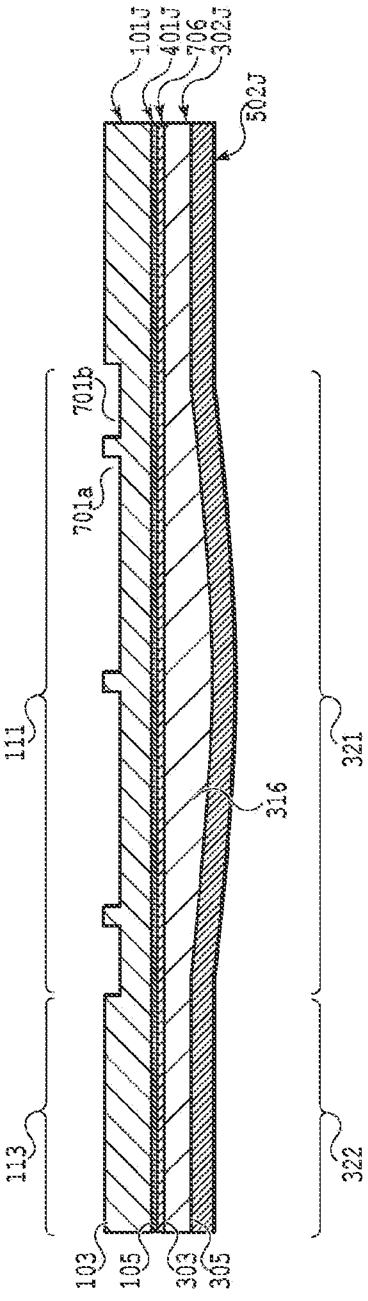

In the present example, the bulging portions 316 are provided in the first secondary back surface regions 321 corresponding to the groove regions 111, in which are formed multiple grooves to be utilized as the supply-side common channels 701*a* or the collection-side common channels 701*b*. This prevents formation of voids. Moreover, even in a case where voids are formed on the joining surfaces of the first secondary back surface regions 321 corresponding to the groove regions 111, the voids can be moved to outer positions from there. More specifically, as illustrated in FIG. 16C, the boundary plane between the thinned second substrate 302J and the adhesive agent 402J is inclined at the first secondary back surface regions 321. The boundary plane between the adhesive agent 402J and the third substrate 501J is inclined as well. Thus, when the thinned second substrate 302J and the third substrate 501J are bonded with the adhesive agent 402J, the adhesive agent 402J easily flows toward portions where the thinned second substrate 302J is thin from portions where the thinned second substrate 302J is thick. With the flow of the adhesive agent 402J, the voids also flow toward the portions where the thinned second substrate 302J is thin from the portions where the thinned second substrate 302J is thick. Thus, in a case where voids are formed on the bonding layer around the bulging portions 316, those voids move to positions outward of the bulging portions 316. In particular, in the configuration in the present example, in regions where the pressure chambers 703 are provided (regions having a cross-sectional shape as illustrated in FIG. 17B), voids formed on the bonding layer around the bulging portions 316 move into the pressure chambers 703. In other words, the voids disappear. In addition, in regions where the supply-side individual channels 702*a*, the collection-side individual channels 702*b*, or the pressure chambers 703 are not provided (regions having a cross-sectional shape as illustrated in FIG. 17C), voids formed on the bonding layer around the bulging portions move to the secondary back surface regions 322.

This prevents the adjacent pressure chambers 703 from communicating with each other. Accordingly, mixing of the liquids in the pressure chambers 703 is prevented.

Providing the bulging portions 316 also improves the strength of the thinned second substrate 302J. This prevents the thinned second substrate 302J from breaking when the thinned second substrate 302J and the third substrate 501J are joined with the adhesive agent 402J.

Note that, in a case where the bulging portions 316 are too tall, voids may be easily formed and the thinned second substrate 302J may easily break when the thinned second substrate 302J and the third substrate 501J are joined with the adhesive agent 402J. The above problems, however, can be prevented by setting the height of the bulging portions 316 to less than a predetermined value.

Example 2

Figure 18A:
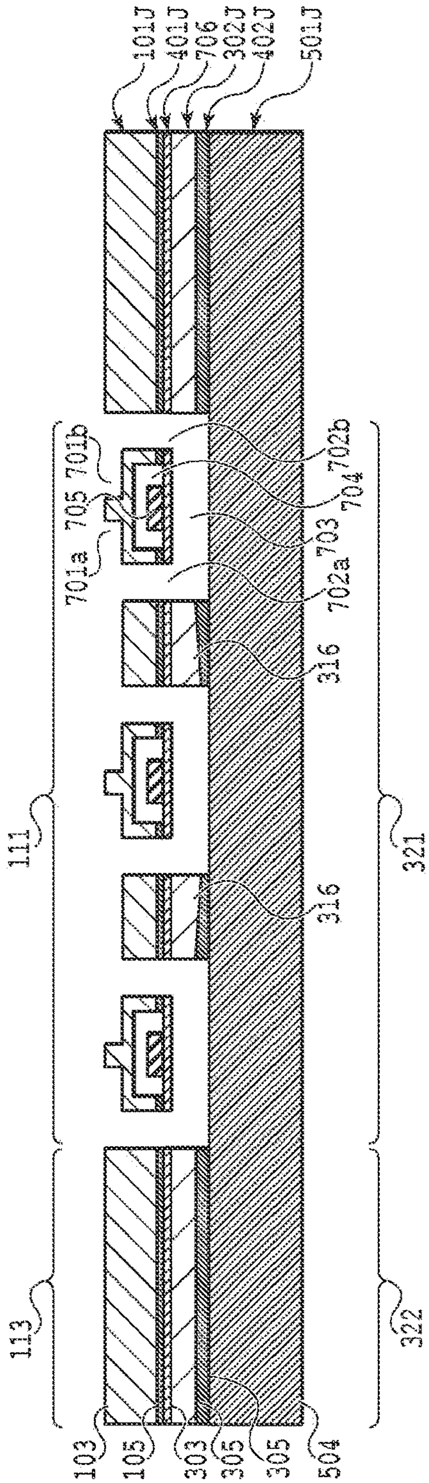
FIGS. 18A to 18C are cross-sectional views illustrating a configuration of a joined substrate according to an example.

FIG. 18A illustrates a configuration in which, like the configuration illustrated in FIG. 6A, an adhesive agent 402J is thin in first secondary back surface regions 321 corresponding to groove regions 111 and is thick in second secondary back surface regions 322 corresponding to flat regions 113. This prevents the third substrate 501J from being bent by bulging portions 316.

Figure 18B:
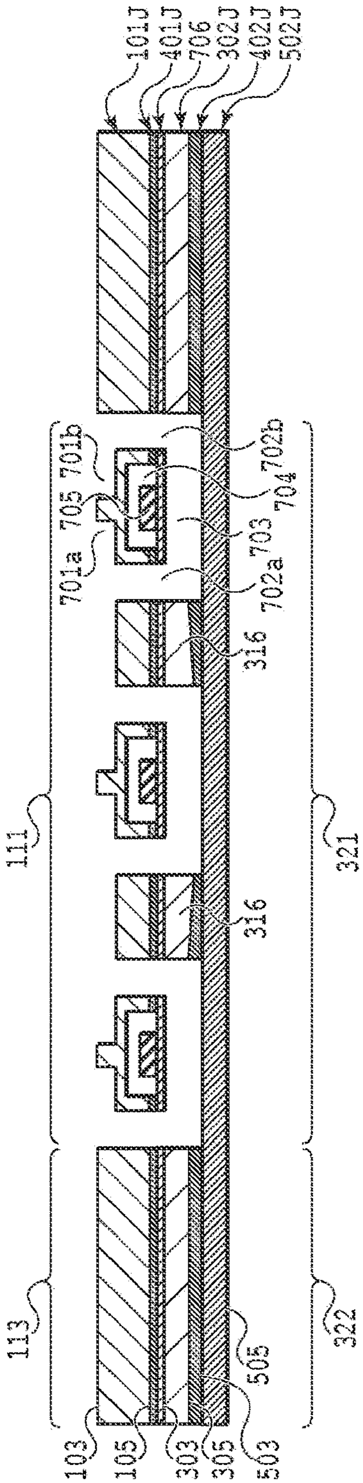

The example illustrated in FIG. 18B illustrates a configuration formed by thinning the third substrate 501J in the three-layer joined substrate illustrated in FIG. 18A so as to avoid upward deformation of the three-layer joined substrate in the groove regions 111.

Figure 18C:
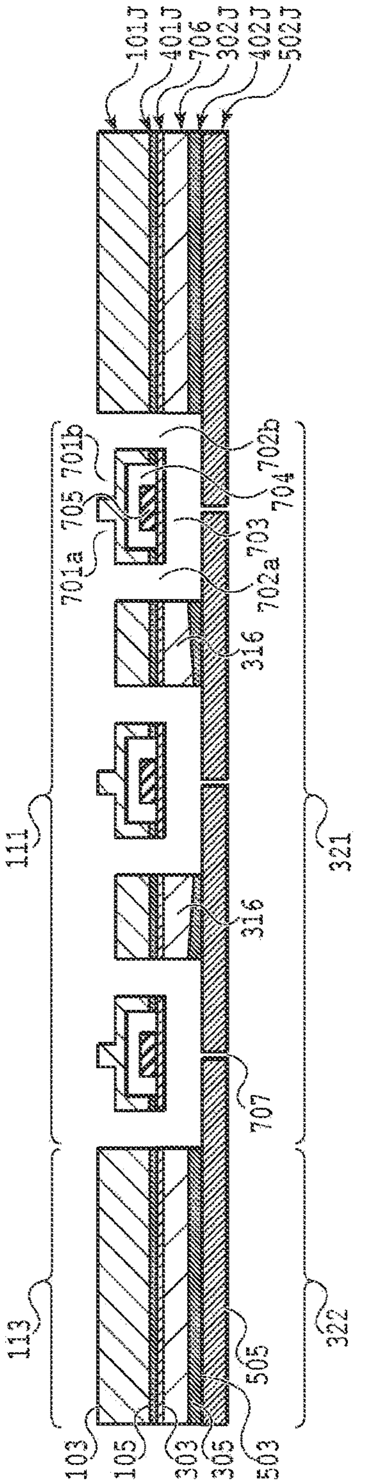

FIG. 18C illustrates an example in which ink ejection ports 707 are formed in the third substrate 502J in the three-layer joined substrate illustrated in FIG. 18B.

According to the present example, the bulging portions 316 are provided, thereby bringing about advantageous effects similar those by Example 1. In particular, the bonding layer made of the adhesive agent 402J has a varying thickness around the bulging portions 316. For this reason, in a case where voids are formed on the bonding layer around the bulging portions 316, those voids can easily move into pressure chambers 703. Other advantageous effects are similar to those by Example 1.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-207560, filed on Dec. 23, 2022, which is hereby incorporated by reference wherein in its entirety.

What is claimed is:

1. A joined substrate in which a first substrate, a second substrate, and a third substrate are joined in this order with an adhesive agent therebetween, the joined substrate comprising:

one or more grooves formed in a groove region of a surface of the first substrate not facing the second substrate; and a bulging portion formed in a back region of a surface of the second substrate not facing the first substrate, the bulging portion bulging in a thickness direction, the back region corresponding to the groove region in a plane direction.

2. The joined substrate according to claim 1, wherein a surface of the third substrate facing the second substrate is flat.

3. The joined substrate according to claim 1, wherein the third substrate is bent in conformity with the bulging portion bulging in the thickness direction.

4. The joined substrate according to claim 1, wherein the grooves at least partly penetrate through the first substrate.

5. The joined substrate according to claim 1, wherein a hollow portion is bored in the first substrate, the hollow portion being open at least to a part of a second back region of a surface of the first substrate facing the second substrate, the second back region corresponding to the groove region in the plane direction.

6. The joined substrate according to claim 1, wherein a through-hole penetrating through the second substrate is bored at least in a part of the back region where the bulging portion of the second substrate bulging in the thickness direction is formed.

7. The joined substrate according to claim 1, wherein a pair of first through-holes are bored in the first substrate, each of the pair of first through-holes penetrating between a part of a bottom of each of a pair of the grooves adjacent to each other and a surface of the first substrate facing the second substrate, a second through-hole is bored in the second substrate, the second through-hole allowing the pair of first through-holes to communicate with each other and penetrating between a first surface and a second surface of the second substrate, a hollow portion is bored in the first substrate, the hollow portion communicating with the second through-hole with a vibration film therebetween, and a third through-hole is bored in the third substrate, the third through-hole allowing the second through-hole and an outside to communicate with each other.

8. The joined substrate according to claim 1, wherein the bulging portion bulging in the thickness direction has a cross-sectional shape protruding outward in a circular arc shape.

9. The joined substrate according to claim 1, wherein thickness of a portion of the second substrate having the bulging portion bulging in the thickness direction corresponding to the one or more grooves is larger by 1.0 [μm] at the maximum than thickness of a portion of the second substrate not having the bulging portion bulging in the thickness direction.

10. The joined substrate according to claim 1, wherein the groove region is a region where the one or more grooves are formed according to intended use of the joined substrate.

11. The joined substrate according to claim 1, wherein the joined substrate is to be used for a droplet ejection head, and the groove region is a region where the one or more grooves to be used as channels in the droplet ejection head are formed.

12. A droplet ejection head comprising:

a joined substrate; and a driving unit that drives a liquid, wherein the joined substrate comprises:

a first substrate, a second substrate, and a third substrate which are joined in this order with an adhesive agent therebetween;

one or more grooves formed in a groove region of a surface of the first substrate not facing the second substrate;

a bulging portion formed in a back region of a surface of the second substrate not facing the first substrate, the bulging portion bulging in a thickness direction, the back region corresponding to the groove region in a plane direction;

a pair of first through-holes which are bored in the first substrate, each of the pair of first through-holes penetrating between a part of a bottom of each of a pair of the grooves adjacent to each other and a surface of the first substrate facing the second substrate, a second through-hole which is bored in the second substrate, the second through-hole allowing the pair of first through-holes to communicate with each other and penetrating between a first surface and a second surface of the second substrate, a hollow portion which is bored in the first substrate, the hollow portion communicating with the second through-hole with a vibration film therebetween, and a third through-hole which is bored in the third substrate, the third through-hole allowing the second through-hole and an outside to communicate with each other, and wherein the pair of grooves are used as a pair of supply-side common channel and a collection-side common channel, the pair of first through-holes are used as a pair of supply-side individual channel and a collection-side individual channel, the second through-hole is used as a pressure chamber, the hollow portion is used to accommodate the driving unit, the third through-hole is used as an ejection port through which the liquid driven by the driving unit is ejected, a part of the liquid accommodated in the pressure chamber through the supply-side common channel and the supply-side individual channel is driven by the driving unit through the vibration film to be ejected through the ejection port, and a rest of the liquid, which is not ejected through the ejection port, is collected through the collection-side individual channel and the collection-side common channel.

13. The droplet ejection head according to claim 12, wherein the joined substrate is used as a head chip having such a configuration that, in a plan view of the joined substrate, the groove region in which the one or more grooves are formed is sandwiched between two flat regions in which grooves are not formed.

14. A joined substrate in which a first substrate and a second substrate are joined with an adhesive agent therebetween, the joined substrate comprising:

one or more grooves formed in a groove region of a surface of the first substrate not facing the second substrate; and a bulging portion formed in a back region of a surface of the first substrate facing the second substrate, the bulging portion bulging in a thickness direction, the back region corresponding to the groove region in a plane direction.

15. The joined substrate according to claim 14, wherein a surface of the second substrate facing the first substrate is flat.

16. The joined substrate according to claim 14, wherein the bulging portion bulging in the thickness direction has a cross-sectional shape protruding outward in a circular arc shape.

17. The joined substrate according to claim 14, wherein thickness of a portion of the first substrate having the bulging portion bulging in the thickness direction corresponding to the one or more grooves is larger by 1.0 [μm] at the maximum than thickness of a portion of the first substrate not having the bulging portion bulging in the thickness direction.

18. The joined substrate according to claim 14, wherein the groove region is a region where the one or more grooves are formed according to intended use of the joined substrate.

19. The joined substrate according to claim 14, wherein the joined substrate is to be used for a droplet ejection head, and the groove region is a region where the one or more grooves to be used as channels in the droplet ejection head are formed.

20. A joined substrate in which a first substrate, a second substrate, and a third substrate are joined in this order with an adhesive agent therebetween, the joined substrate comprising:

one or more grooves formed in a groove region of a surface of the first substrate not facing the second substrate;

a hollow portion bored in the first substrate so as to open to a predetermined region of a surface of the first substrate facing the second substrate;

a first bulging portion formed in a first back region of a surface of the second substrate not facing the first substrate, the first bulging portion bulging in a thickness direction, the first back region corresponding to the groove region in a plane direction; and a second bulging portion formed in a second back region of a surface of the second substrate not facing the first substrate, the second bulging portion bulging in the thickness direction, the second back region corresponding to the predetermined region in the plane direction.

* * * * *